United States Patent
Taniguchi et al.

(10) Patent No.: US 12,263,842 B2
(45) Date of Patent: *Apr. 1, 2025

(54) VEHICLE TRAVEL ASSISTANCE METHOD AND VEHICLE TRAVEL ASSISTANCE DEVICE

(71) Applicant: Nissan Motor Co., Ltd., Yokohama (JP)

(72) Inventors: Yohei Taniguchi, Kanagawa (JP); Yuji Nagasawa, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/712,153

(22) PCT Filed: Nov. 22, 2021

(86) PCT No.: PCT/JP2021/042837
§ 371 (c)(1),
(2) Date: May 21, 2024

(87) PCT Pub. No.: WO2023/089835
PCT Pub. Date: May 25, 2023

(65) Prior Publication Data
US 2024/0416916 A1   Dec. 19, 2024

(51) Int. Cl.
*B60W 30/18*   (2012.01)
*B60W 50/14*   (2020.01)

(52) U.S. Cl.
CPC ...... *B60W 30/18163* (2013.01); *B60W 50/14* (2013.01); *B60W 2520/10* (2013.01);
(Continued)

(58) Field of Classification Search
CPC .......... B60W 30/18163; B60W 50/14; B60W 2520/10; B60W 2520/105;
(Continued)

(56) References Cited

U.S. PATENT DOCUMENTS 8,880,272 B1 * 11/2014 Ferguson ............ B60W 60/001
 701/26
12,097,884 B2 * 9/2024 Li .................... B60W 60/0017
(Continued)

FOREIGN PATENT DOCUMENTS

| | | |
|---|---|---|
| JP | 2015-011458 A | 1/2015 |
| JP | 2021-076614 A | 5/2021 |

(Continued)

*Primary Examiner* — Babar Sarwar
(74) *Attorney, Agent, or Firm* — Young Basile Hanlon & MacFarlane, P.C.

(57) ABSTRACT

A travel assistance method and device, when performing a first lane change with autonomous lane change control and then performing a second lane change for traveling along a set travel route, determines whether or not a distance from a position at which the first lane change has concluded to a position at which the second lane change can be started is a predetermined distance or less. When it is determined that the distance is the predetermined distance or less, whether assistance with the autonomous lane change control is enabled for the second lane change is determined. When assistance with the autonomous lane change control is enabled, whether a lane change can be made from a subject vehicle lane to an adjacent lane is determined. When the lane change to the adjacent lane can be made, the second lane change is made with the autonomous lane change control.

6 Claims, 10 Drawing Sheets

(52) U.S. Cl.
CPC . *B60W 2520/105* (2013.01); *B60W 2520/125* (2013.01); *B60W 2552/10* (2020.02); *B60W 2552/30* (2020.02); *B60W 2556/40* (2020.02)

(58) Field of Classification Search
CPC ....... B60W 2520/125; B60W 2552/10; B60W 2552/30; B60W 2556/40
See application file for complete search history.

(56) References Cited

U.S. PATENT DOCUMENTS

| | | | |
|---|---|---|---|
| 2015/0360684 A1* | 12/2015 | Matsuno | B60W 30/18163 701/23 |
| 2016/0214612 A1* | 7/2016 | Kashiba | B60W 60/0053 |
| 2017/0305465 A1* | 10/2017 | Mielenz | B60W 30/18163 |
| 2017/0341653 A1* | 11/2017 | Kubota | B60W 50/0097 |
| 2018/0033309 A1* | 2/2018 | Norwood | B62D 15/029 |
| 2019/0100211 A1* | 4/2019 | Liu | B60W 60/00276 |
| 2019/0202457 A1* | 7/2019 | Kito | B60W 30/162 |
| 2019/0359209 A1* | 11/2019 | Mizutani | B60W 30/18163 |
| 2021/0237739 A1 | 8/2021 | Hayakawa et al. | |
| 2022/0001867 A1* | 1/2022 | Hashimoto | B60W 60/001 |
| 2022/0289228 A1* | 9/2022 | Yamamoto | B60W 30/18163 |
| 2023/0159051 A1* | 5/2023 | Kato | B60W 10/20 701/26 |
| 2024/0025412 A1* | 1/2024 | Zhang | B60W 40/02 |
| 2024/0278796 A1* | 8/2024 | Kubota | G08G 1/16 |

FOREIGN PATENT DOCUMENTS

| | | | | |
|---|---|---|---|---|
| JP | 2021-091282 A | 6/2021 | | |
| WO | WO-2020003452 A1 * | 1/2020 | ............ | B60W 10/20 |
| WO | 2020/035896 A1 | 2/2020 | | |

\* cited by examiner

VEHICLE TRAVEL ASSISTANCE METHOD AND VEHICLE TRAVEL ASSISTANCE DEVICE

TECHNICAL FIELD

The present invention relates to a travel assistance method and a travel assistance device for a vehicle.

BACKGROUND

A device for assisting a lane change is known, which is configured to: determine a travel route by using road network information that corresponds to road map data; store a limit level that limits a lane change for each lane of a road in correlation with positions on the lane; acquire a traveling position of a vehicle; refer to the limit level on the travel route based on the acquired traveling position of the vehicle; and present lane change information for traveling along the travel route (JP2021-76614A).

SUMMARY

In the above prior art document, however, there is no description about the relationship between whether or not a lane change can be made using autonomous travel control and the information presented to the driver. There is therefore a problem in that, with the above-described prior art, it is not known what information should be notified to the driver in accordance with whether a lane change using the autonomous travel control is possible.

A problem to be solved by the present invention is to provide a travel assistance method and a travel assistance device for a vehicle that are able to notify the driver of appropriate information in accordance with whether or not a lane change using autonomous travel control can be executed.

The present invention solves the above problem in the following manner when executing autonomous lane change control based on a travel route to a destination. In a travel scene of performing a first lane change with the autonomous lane change control and then performing a second lane change for traveling along the travel route, when assistance with the autonomous lane change control is not enabled, unless the distance from a position at which the first lane change has concluded to a position at which the second lane change can be started is a predetermined distance or less, the second lane change with the autonomous lane change control is not performed and the driver is not notified that a lane change with the autonomous lane change control cannot be made. Even when the assistance with the autonomous lane change control is not enabled, when the above-described distance is the predetermined distance or less, the second lane change with the autonomous lane change control is not performed and the driver is notified that the lane change with the autonomous lane change control cannot be made.

According to the present invention, it is possible to notify the driver of appropriate information in accordance with whether or not a lane change using the autonomous travel control can be executed.

DETAILED DESCRIPTION

Hereinafter, one or more embodiments of the present invention will be described with reference to the drawings. The following description is made on the assumption that the vehicle travels on the left side in a country having a left-side traffic regulation. In countries having right-side traffic regulations, vehicles travel on the right side, so the right and left in the following description are to be read symmetrically.

<Configuration of Travel Assistance System>

Figure 1:
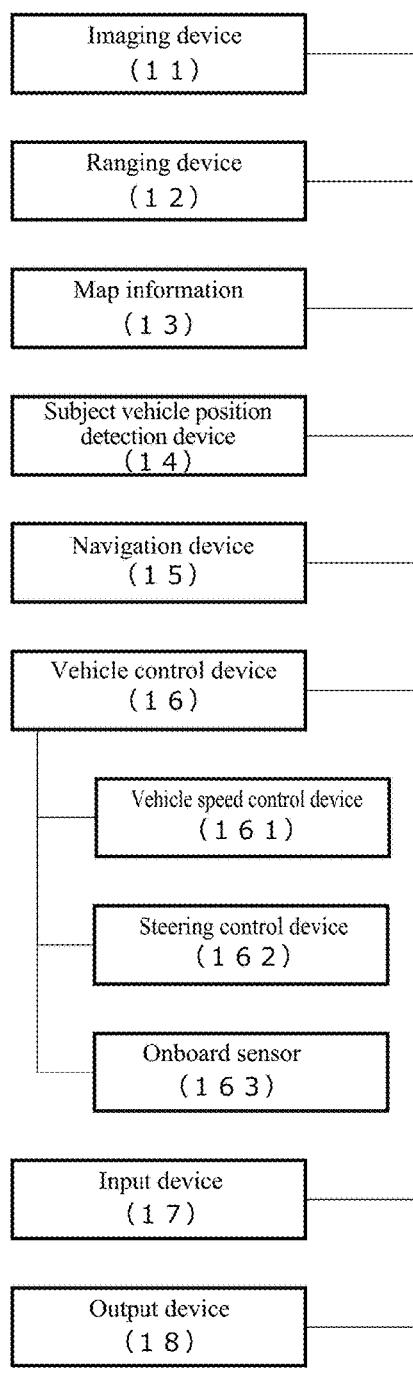
FIG. 1 is a block diagram illustrating a travel assistance system including the travel assistance device of the present invention.
Figure 1:
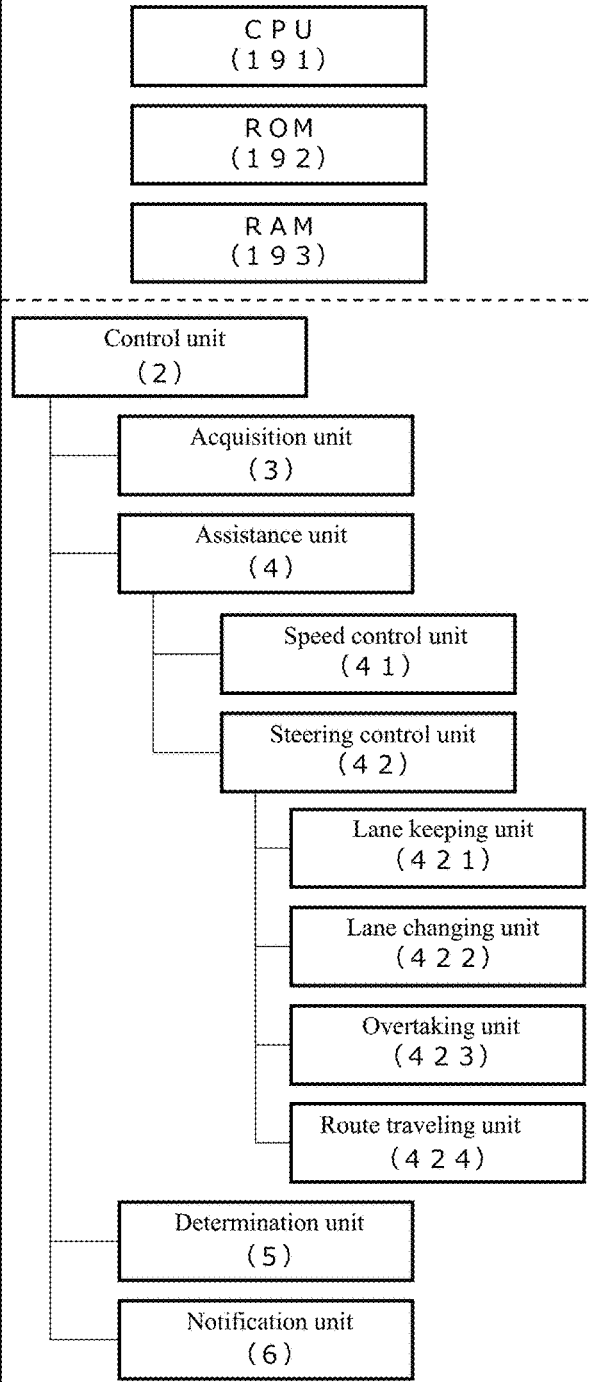

FIG. 1 is a block diagram illustrating a travel assistance system 1 according to the present invention. The travel assistance system 1 of the present embodiment is an onboard system, which can be used not only for a private vehicle that travels by autonomous travel control to a destination set by an occupant of a subject vehicle (also simply referred to as "the vehicle," hereinafter), but also for a vehicle that is allocated, for example, in a vehicle allocation service. The vehicle allocation service refers to allocating and dispatching a vehicle to a user to transport the user from a boarding location to an alighting location. Examples of vehicle allocation services include allocation of manned and unmanned taxis, allocation of vehicles used for transportation services at airports, stations, hotels, etc., and allocation of vehicles used for car rental and ride-sharing services. Users of vehicle allocation services are not particularly limited, provided that they can appropriately pay for the services.

As illustrated in FIG. 1, the travel assistance system 1 includes an imaging device 11, a ranging device 12, map information 13, a subject vehicle position detection device 14, a navigation device 15, a vehicle control device 16, an input device 17, an output device 18, and a travel assistance device 19. The devices included in the travel assistance system 1 are connected via a controller area network (CAN) or other onboard LAN and can exchange information with each other.

The imaging device 11 is a device that recognizes objects around the subject vehicle using images. The imaging device 11 may be, for example, one or more cameras such as cameras including CCDs or other imaging elements, ultrasonic cameras, or infrared cameras. Two or more imaging devices 11 can be provided in one vehicle. For example, such imaging devices 11 may be arranged in the front grille portion of the vehicle, below the right and left door mirrors, and near the rear bumper. This can reduce blind spots when recognizing objects around the vehicle. The imaging devices 11 also include a driver monitor that images the driver.

The ranging device 12 is a device for calculating the relative distance and relative speed between the vehicle and an object. The ranging device 12 may be, for example, one or more radar devices or sonars, such as laser radars, millimeter wave radars, other similar radars (LRF or the like), light detection and ranging (LiDAR) units, and ultrasonic radars. Two or more ranging devices 12 can be provided in one vehicle. For example, such ranging devices 12 may be arranged at the front, right side, left side, and rear of the vehicle. This allows the relative distance and relative speed between the vehicle and a surrounding object to be calculated accurately.

Objects detected with the imaging device 11 and ranging device 12 are lane boundary lines of roads, center lines, road surface signs, median strips, guardrails, curbstones, highway side walls, road signs, traffic lights, pedestrian crossings, construction sites, accident sites, traffic restrictions, etc. Objects also include obstacles that may affect the travel of the subject vehicle, such as automobiles (other vehicles) other than the subject vehicle, motorcycles, bicycles, and pedestrians. The detection results of the imaging device 11 and ranging device 12 are acquired by the travel assistance device 19 at predetermined time intervals.

The detection results of the imaging device 11 and ranging device 12 can be integrated or synthesized by the travel assistance device 19. This can complement missing information about the detected objects. For example, the travel assistance device 19 can calculate the positional information of an object using the self-position information, which represents the position of the subject vehicle traveling, and the relative position (distance and direction) between the subject vehicle and the object. The self-position information and the relative position are acquired by the subject vehicle position detection device 14, which will be described later. The calculated positional information of the object is integrated with multiple information items such as the detection results of the imaging device 11 and ranging device 12 and the map information 13 in the travel assistance device 19 and becomes environmental information around the subject vehicle. Additionally or alternatively, the detection results of the imaging device 11 and ranging device 12 and the map information 13 can be used to recognize objects around the subject vehicle and predict their movements.

The map information 13 is information used for generation of a travel route and/or travel control and includes road information, facility information, and their attribute information. The road information and road attribute information include information on a road width, a curvature and a radius of curvature of a road, a road shoulder structure, a road traffic regulation (speed limit, whether lane change is permitted), a merging point and a branching point of a road, a position at which the number of lanes increases/decreases, and other similar information. The map information 13 of the present embodiment is high-accuracy map information that allows the movement trajectory for each lane to be perceived, and includes two-dimensional positional information and/or three-dimensional positional information at each map coordinate, road/lane boundary information at each map coordinate, road attribute information, lane inbound/outbound information, lane identification information, connection destination lane information, etc. The high-accuracy map is also referred to as a high-definition (HD) map.

The road/lane boundary information of the high-accuracy map information is information that represents a boundary between the route on which the subject vehicle travels and another area. The travel route on which the subject vehicle travels refers to a road for the subject vehicle to travel, and the form of the travel route is not particularly limited. The boundary exists on each of the right and left sides with respect to the traveling direction of the subject vehicle, and the form of the boundary is not particularly limited. Examples of boundaries include road surface signs and road structures. Examples of road surface signs include lane boundary lines and center lines. Examples of road structures include median strips, guardrails, curbstones, tunnels, and highway side walls. At a point at which the travel route boundary cannot be clearly specified, such as inside an intersection, a boundary is preliminarily set on the travel route. This boundary is an imaginary boundary, rather than a road surface sign or a road structure that actually exists.

The map information 13 is stored in a readable state in a recording medium of onboard devices including the travel assistance device 19 or a server on a network. The travel assistance device 19 acquires the map information 13 as necessary.

The subject vehicle position detection device 14 is a positioning system for detecting the current position of the subject vehicle and is not particularly limited, and a known device can be used. The subject vehicle position detection device 14 calculates the current position of the subject vehicle, for example, from radio waves received from satellites for a global positioning system (GPS). Additionally or alternatively, the subject vehicle position detection device 14 may estimate the current position of the subject vehicle from the vehicle speed information acquired from the vehicle speed sensor and the acceleration information acquired from the acceleration sensor and gyro sensor, and cross-check the estimated current position with the map information 13 thereby to calculate the current position of the subject vehicle.

The navigation device 15 is a device that calculates, with reference to the map information 13, a travel route from the current position of the subject vehicle detected by the subject vehicle position detection device 14 to a destination that is set by the driver. The navigation device 15 uses, for example, the road information and facility information of the map information 13 to search for a travel route for the subject vehicle to reach the destination from the current position. The travel route includes at least information on the road on which the subject vehicle travels, the travel lane, and the traveling direction of the subject vehicle, and is displayed, for example, in a linear format. There may be multiple travel routes depending on the search conditions. The travel route calculated by the navigation device 15 is output to the travel assistance device 19.

The vehicle control device 16 is an onboard computer such as an electronic control unit (ECU) and electronically controls onboard equipment that is responsible for the travel of the vehicle. The vehicle control device 16 includes a vehicle speed control device 161 that controls the traveling speed of the subject vehicle, and a steering control device 162 that controls the steering operation of the subject vehicle. The vehicle speed control device 161 and the steering control device 162 autonomously control the operations of drive device and steering device in accordance with control signals that are input from the travel assistance device 19. This allows the subject vehicle to autonomously travel along the set travel route.

The drive device controlled by the vehicle speed control device 161 includes an electric motor and/or an internal-combustion engine as the traveling drive sources, a power transmission device including a drive shaft and an automatic transmission that transmit the output of the traveling drive sources to the drive wheels, a drive device that controls the power transmission device, etc. The braking device controlled by the vehicle speed control device 161 is, for example, a braking device that brakes the wheels. Controls signals corresponding to the set traveling speed are input to the vehicle speed control device 161 from the travel assistance device 19. The vehicle speed control device 161 generates control signals for controlling these components of the drive device based on the control signals that are input from the travel assistance device 19, and transmits the signals to the drive device thereby to autonomously control the traveling speed of the vehicle.

On the other hand, the steering device controlled by the steering control device 162 includes a steering device that controls all the steered wheels in accordance with the steering angle of the steering wheel (so-called wheel), for example, a steering actuator such as a motor attached to a column shaft of the steering wheel. The steering control device 162 uses at least one of the detection results of the imaging device 11 and ranging device 12, the map information 13, and the information on the current position acquired by the subject vehicle position detection device 14 based on the control signals input from the travel assistance device 19 to autonomously control the operation of the steering device so that the subject vehicle travels while maintaining a predetermined lateral position (position in the right-left direction of the vehicle) with respect to the set travel route.

Information necessary for autonomous control in the vehicle speed control device 161 and steering control device 162, such as the traveling speed, acceleration, steering angle, and attitude of the subject vehicle, is detected using an onboard sensor 163 included in the vehicle control device 16. The onboard sensor 163 is a sensor for detecting the traveling state of the vehicle, and examples of the onboard sensor 163 include a vehicle speed sensor, an acceleration sensor, a gyro sensor, a steering angle sensor, and an inertial measurement unit (IMU). Additionally or alternatively, the onboard sensor 163 includes a touch sensor (capacitance sensor) that detects whether the driver is holding the steering wheel. The vehicle control device 16 outputs the detection results of the onboard sensor 163 to the travel assistance device 19 at predetermined time intervals.

The input device 17 is a device for an occupant of the vehicle to input instructions to the travel assistance device 19. Examples of the input device 17 include a touch panel for inputting with a user's finger or a stylus pen, a microphone for acquiring voice instructions from the user, and a switch attached to the steering wheel of the vehicle.

Figure 2:
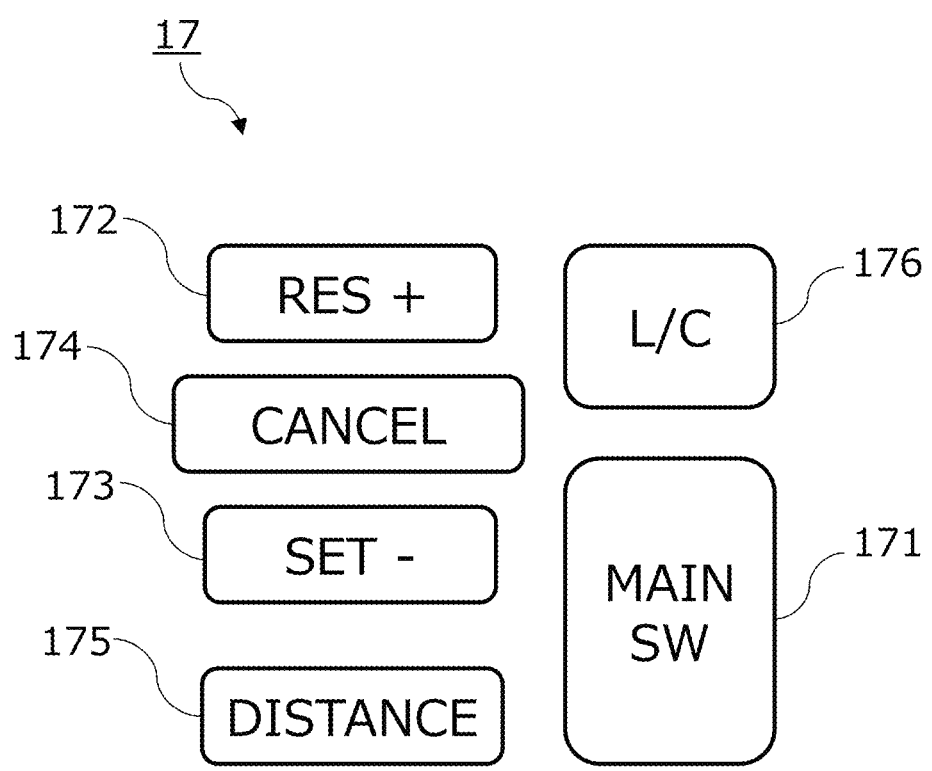
FIG. 2 is a front view illustrating a part of the input device of FIG. 1.

As an example of the input device 17, a switch attached to the steering wheel of the vehicle is illustrated in FIG. 2. FIG. 2 is a front view illustrating a part of the input device 17 and represents a set of button switches arranged on a spoke of the steering wheel. The input device 17 illustrated in FIG. 2 is a set of button switches used when setting ON/OFF or the like of the autonomous travel control function (autonomous speed control function and autonomous steering control function) of the travel assistance device 19. The input device 17 includes a main switch (MAIN SW) 171, a resume/acceleration switch (RES+) 172, a set/coast switch (SET-) 173, a cancel switch (CANCEL) 174, an inter-vehicle distance adjustment switch (DISTANCE) 175, and a lane change assist switch (L/C) 176.

The main switch 171 is a switch for turning ON/OFF the power source of the system which achieves the autonomous speed control function and autonomous steering control function of the travel assistance device 19. The resume/acceleration switch 172 is a switch for stopping (turning OFF) the autonomous speed control and then resuming the autonomous speed control at the set speed before the OFF state, for increasing the set speed, and/or for following a preceding vehicle to stop and then restarting by the travel assistance device 19. The set/coast switch 173 is a switch for starting the autonomous speed control at the speed when traveling and/or lowering the set speed. The cancel switch 174 is a switch for turning OFF the autonomous speed control. The inter-vehicle distance adjustment switch 175 is a switch for setting the inter-vehicle distance from a preceding vehicle and is, for example, a switch for selecting one from a plurality of stages of settings, such as a short distance, a medium distance, and a long distance. The lane change assist switch 176 is a switch for instructing (accepting) the start of a lane change when the travel assistance device 19 confirms the start of the lane change with the driver. By operating the lane change assist switch 176 for a longer time than a predetermined time after accepting the start of the lane change, the acceptance of the lane change proposed by the travel assistance device 19 can be revoked.

Alternatively or additionally to the button switches illustrated in FIG. 2, a direction indicator lever for the direction indicators or a switch of other onboard equipment can be used as the input device 17. For example, in a case in which the travel assistance device 19 proposes whether or not to automatically change lanes, when the driver operates the direction indicator lever, the lane change is performed toward the direction in which the direction indicator lever is operated, rather than the proposed lane change. The input device 17 outputs the input setting information to the travel assistance device 19. Details of the autonomous travel control, autonomous speed control, and autonomous steering control will be described later.

Referring again to FIG. 1, the output device 18 is a device for providing necessary information to occupants of the vehicle. For example, the output device 18 is any of a projector such as a head-up display (HUD), a liquid crystal display provided on the instrument panel, and a display embedded in the rearview mirror. Examples of the output device 18 further include a device that provides information visually, a device that provides information audibly, such as a speaker of an audio device, and a device that provides information in the form of vibration, such as a seat in which a vibrating body is embedded.

The travel assistance device 19 is a device that controls the travel of the subject vehicle by controlling the devices included in the travel assistance system 1 to cooperate with each other and allows the subject vehicle to travel to a destination set by an occupant of the vehicle or the user of a vehicle allocation service. The travel assistance device 19 is, for example, a computer and includes a central processing unit (CPU) 191 that is a processor, a read only memory (ROM) 192 that stores programs, and a random access memory (RAM) 193 that serves as an accessible storage device. The CPU 191 is an operating circuit that serves as the travel assistance device 19 by executing programs stored in the ROM 192.

<Functions of Control Unit>

The programs stored in the ROM 192 include a control unit 2 that is a functional block for achieving control of the travel of the subject vehicle with the travel assistance device 19. The control unit 2 has a function of allowing the subject vehicle to travel by the autonomous travel control. The autonomous travel control refers to autonomously controlling the traveling operations of the subject vehicle using the travel assistance device 19. The traveling operations include all traveling operations such as acceleration, deceleration, starting, stopping, turning to the right or left, changing lanes, and pulling over. Autonomously controlling the traveling operations means that the travel assistance device 19 controls the traveling operations using a device of the subject vehicle. That is, the control unit 2 intervenes and controls these traveling operations within a predetermined range. Traveling operations that do not require intervention are manually operated by the driver.

As illustrated in FIG. 1, the control unit 2 includes an acquisition unit 3, an assistance unit 4, a determination unit 5, and a notification unit 6. The assistance unit 4 includes a speed control unit 41 and a steering control unit 42. The steering control unit 42 includes a lane keeping unit 421, a lane changing unit 422, an overtaking unit 423, and a route traveling unit 424. In FIG. 1, each unit is extracted and illustrated for descriptive purposes. The functions performed by each functional block of the control unit 2 will be described below.

The acquisition unit 3 has a function of acquiring information regarding a traveling state of the subject vehicle (also referred to as "travel information," hereinafter). In the following description, the function of acquiring the travel information will be also referred to as a "travel information acquisition function." For example, the travel assistance device 19 uses the travel information acquisition function of the acquisition unit 3 to acquire as the travel information the external images around the vehicle captured by the front camera, rear camera, and side cameras which are each the imaging device 11. In addition, the travel assistance device 19 uses the travel information acquisition function of the acquisition unit 3 to acquire as the travel information the detection results by the front radar, rear radar, and side radars which are each the ranging device 12. Alternatively or additionally to this, the travel assistance device 19 acquires as the travel information the traveling speed of the subject vehicle detected by the vehicle speed sensor, which is the onboard sensor 163, and/or the image information of the driver's face captured by the onboard camera.

The travel assistance device 19 uses the travel information acquisition function of the acquisition unit 3 to acquire as the travel information the current positional information of the vehicle from the subject vehicle position detection device 14. In addition, the travel assistance device 19 uses the travel information acquisition function of the acquisition unit 3 to acquire as the travel information the set destination and the travel route to the destination from the navigation device 15. Alternatively or additionally to this, the travel assistance device 19 acquires as the travel information the positional information of curved roads and the size of the curve (e.g., curvature or radius of curvature), merging points, branching points, tollgates, positions at which the number of lanes decreases, etc. from the map information 13. Alternatively or additionally to this, the travel assistance device 19 acquires as the travel information the information on an operation input by the driver from the input device 17.

The assistance unit 4 has a function of autonomously controlling the travel of the subject vehicle without depending on the driver's operation. The assistance unit 4 includes the speed control unit 41 having a function of autonomously controlling the traveling speed of the subject vehicle and the steering control unit 42 having a function of autonomously controlling the steering of the subject vehicle. Here, autonomously controlling the travel of the subject vehicle without depending on the driver's operation is also referred to as "autonomous travel control." Autonomously controlling the traveling speed of the subject vehicle is also referred to as "autonomous speed control," and autonomously controlling the steering of the subject vehicle is also referred to as "autonomous steering control."

When detecting a preceding vehicle, the travel assistance device 19 uses the autonomous speed control with the speed control unit 41 to allow the subject vehicle to follow the preceding vehicle while performing the inter-vehicle distance control so as to maintain the inter-vehicle distance in accordance with the vehicle speed with an upper limit of the vehicle speed that is set by the driver. On the other hand, when no preceding vehicle is detected, constant speed traveling is performed at a vehicle speed that is set by the driver. The former is also referred to as inter-vehicle distance control while the latter is also referred to as constant speed control. The speed control unit 41 may have a function of detecting the speed limit of a traveling road from a road sign using the imaging device 11, or acquiring the speed limit from the map information 13, to automatically set the speed limit as a set vehicle speed.

To activate the autonomous speed control with the speed control unit 41, the driver first operates the resume/acceleration switch 172 or set/coast switch 173 of the input device 17 illustrated in FIG. 2 to input a desired traveling speed. For example, when the set/coast switch 173 is pressed while the subject vehicle is traveling at 70 km/h, the current traveling speed is set without any modification, but if the speed desired by the driver is 80 km/h, the resume/acceleration switch 172 may be pressed a plurality of times to increase the set speed. On the contrary, if the speed desired by the driver is 60 km/h, the set/coast switch 173 may be pressed a plurality of times to decrease the set speed. The inter-vehicle distance desired by the driver may be selected, for example, from a plurality of stages of settings such as short distance/medium distance/long distance by operating the inter-vehicle distance adjustment switch 175 of the input device 17 illustrated in FIG. 2.

The constant speed control is executed when the front radar or the like of the ranging device 12 detects no preceding vehicle ahead of the subject vehicle in its lane. In the constant speed control, the vehicle speed control device 161 controls the operation of the drive mechanism such as the engine and the brake while feeding back the vehicle speed data obtained by the vehicle speed sensor, which is the onboard sensor 163, so as to maintain the set traveling speed.

The inter-vehicle distance control is executed when the front radar or the like of the ranging device 12 detects a preceding vehicle ahead of the subject vehicle in its lane. In the inter-vehicle distance control, the vehicle speed control device 161 controls the operation of the drive mechanism such as the engine and the brake while feeding back the inter-vehicle distance data detected by the front radar so as to maintain the set inter-vehicle distance with an upper limit of the vehicle speed that is set by the driver. If the preceding vehicle stops while the subject vehicle is traveling under the inter-vehicle distance control, the subject vehicle also stops following the preceding vehicle. In addition, if the preceding vehicle starts, for example, within 30 seconds after the subject vehicle stops, the subject vehicle also starts traveling to follow the preceding vehicle again by the inter-vehicle distance control. If the subject vehicle stops for more than 30 seconds, the subject vehicle does not start in an automated or autonomous manner even when the preceding vehicle starts, and after the preceding vehicle starts, the subject vehicle starts traveling to follow the preceding vehicle again by the inter-vehicle distance control when the resume/acceleration switch 172 is pressed or the accelerator pedal is depressed.

When a predetermined condition is satisfied during the execution of the above-described autonomous speed control function, the autonomous steering control with the steering control unit 42 is used for controlling the operation of the steering actuator with the steering control device 162 thereby to execute the steering control of the subject vehicle. The steering control unit 42 includes, for example, the lane keeping unit 421, the lane changing unit 422, the overtaking unit 423, and the route traveling unit 424.

The lane keeping unit 421 has a function of controlling the steering actuator with the steering control device 162 to assist the driver's steering operation so that the subject vehicle travels near the center of the lane. The function possessed by the lane keeping unit 421 is also referred to as a "lane keeping function" or a "lane width direction maintaining function." The control with the lane keeping unit is also referred to as "lane keeping control."

Figure 3:
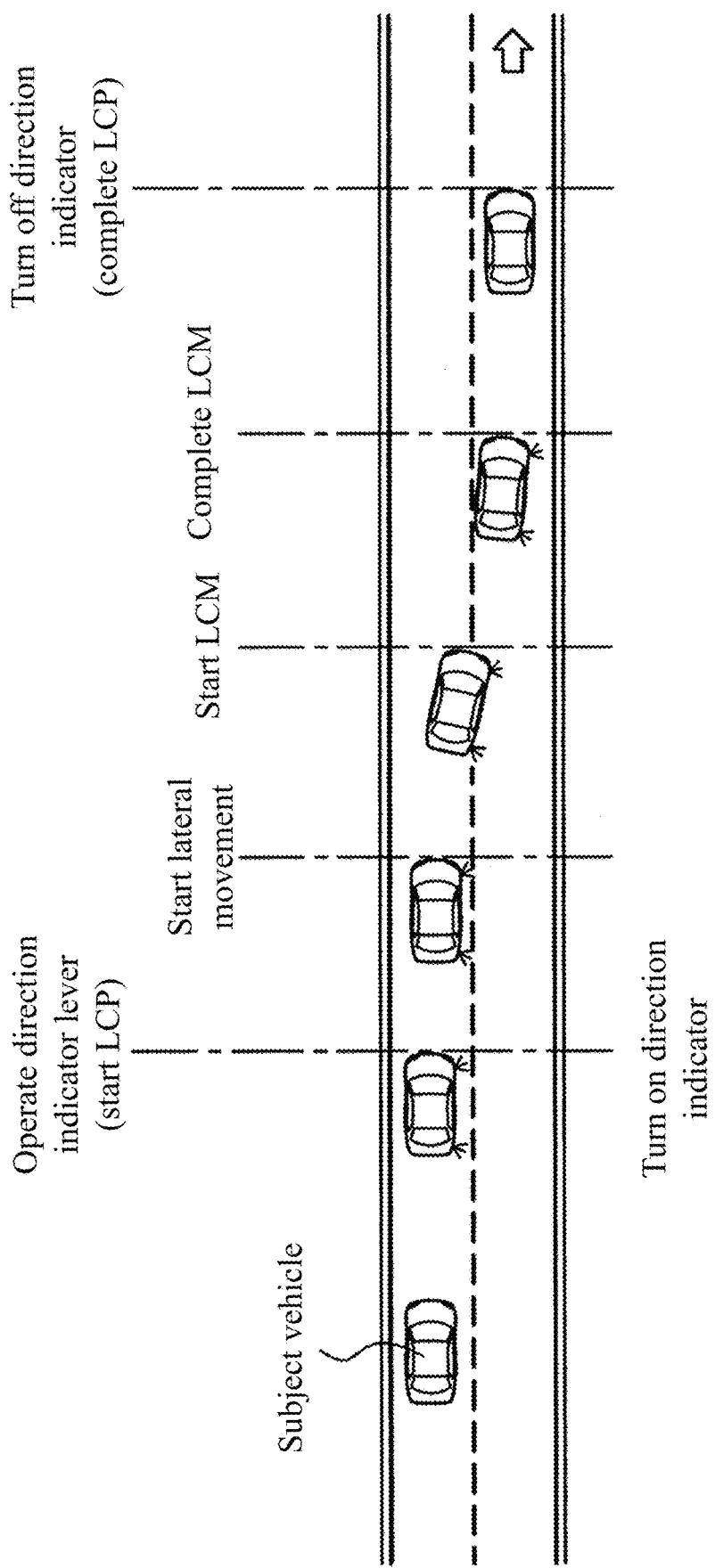
FIG. 3 is a plan view illustrating a lane change using autonomous lane change control.

The lane changing unit 422 has a function of performing a lane change with the autonomous travel control. In the following description, control of performing a lane change from a subject vehicle lane to an adjacent lane in the autonomous traveling with the autonomous travel control is also referred to as "autonomous lane change control." The subject vehicle lane is a lane in which the subject vehicle travels, and the adjacent lane is a lane adjacent to the subject vehicle lane. As illustrated in FIG. 3, when the driver operates the direction indicator lever, the travel assistance device 19 uses the autonomous lane change control with the lane changing unit 422 to turn on the direction indicators, and when a preliminarily set lane change start condition is satisfied, the travel assistance device 19 starts a lane change performance (abbreviated as LCP, hereinafter) that is a series of processes for the lane change with the autonomous travel control. When a button operation is performed to accept start of the autonomous lane change control, such as when the lane change assist switch 176 of the input device 17 is operated, the direction indicators may be turned on and the LCP may be started. The travel assistance device 19 uses the autonomous lane change control to determine whether or not the lane change start condition is satisfied, based on various travel information items acquired with the travel information acquisition function of the acquisition unit 3. Examples of the lane change start condition include, but are not limited to, a condition in which all of the following conditions are satisfied:

The lane keeping mode is carried out in a hands-on mode;
Hands-on determination is made;
The vehicle is traveling at a speed of 60 km/h or more;
There is a lane in the lane change direction;
The lane as the lane change destination includes a space to which a lane change is possible;
The type of lane markers indicates that a lane change is permitted;
The radius of curvature of the road is 250 m or more; and
The elapsed time after the driver operates the direction indicator lever is within one second.

The lane keeping mode in the hands-on mode, which will be described later in detail, refers to a state in which the autonomous speed control with the speed control unit 41 and the lane keeping control with the lane keeping unit 421 are being executed and the holding of the steering wheel by the driver is detected. The hands-on determination being made refers to a state in which the driver continues to hold the steering wheel.

When the lane change start condition is satisfied, the travel assistance device 19 uses the autonomous lane change control with the lane changing unit 422 to start the LCP. The LCP includes lateral movement of the subject vehicle to an adjacent lane and lane change maneuver (abbreviated as LCM, hereinafter) for actually moving to the adjacent lane. During the execution of the LCP, the travel assistance device 19 uses the output device 18 to present the driver with information indicating that the lane change is performed in an automated or autonomous manner and also calls attention to the surroundings. When the LCM with the autonomous lane change control is concluded, the travel assistance device 19 turns off the direction indicators and starts the control with the lane keeping unit 421 in the adjacent lane.

Figure 4:
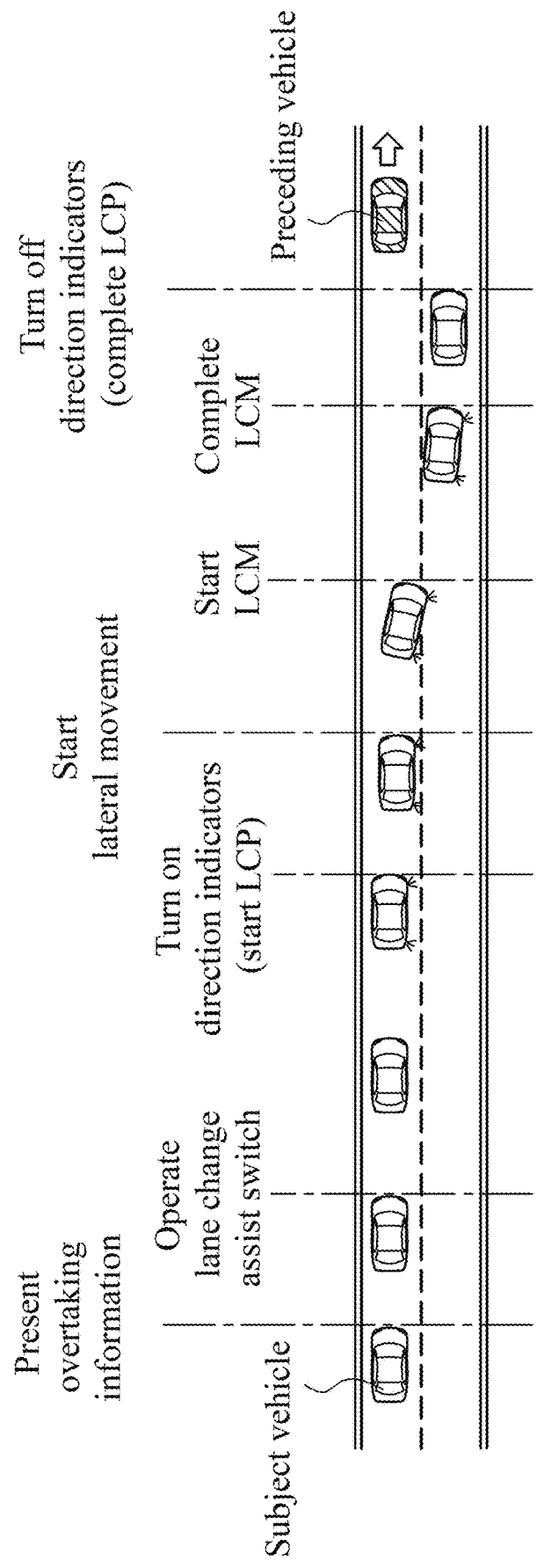
FIG. 4 is a plan view illustrating a lane change to an adjacent lane using overtaking assist control.

The overtaking unit 423 has a function of overtaking a preceding vehicle with the autonomous travel control. In the following description, control for overtaking a preceding vehicle with the autonomous travel control will also be referred to as "overtaking assist control." The overtaking assist control is a type of the autonomous lane change control, and is the autonomous lane change control in a travel scene of overtaking a preceding vehicle. As illustrated in FIG. 4, when a preceding vehicle slower than the subject vehicle is present ahead of the subject vehicle in its lane and a predetermined overtaking proposal condition that is preliminarily set is satisfied, the travel assistance device 19 uses the function of the overtaking unit 423 to present the driver with overtaking information from the output device 18. Here, the overtaking information refers to information for proposing to overtake a preceding vehicle to the driver. The travel assistance device 19 starts the above-described LCP when the driver operates the lane change assist switch 176 of the input device 17 for acceptance (corresponding to the acceptance input) in response to the presentation of the overtaking information and an overtaking start condition that is preliminarily set is satisfied. The acceptance input includes the driver operating the direction indicator lever to the right or left. The travel assistance device 19 determines, based on various travel information items acquired with the acquisition unit 3, whether or not the overtaking proposal condition and the overtaking start condition are satisfied. The overtaking assist control may include a function of starting the LCP for overtaking a preceding vehicle when the driver operates the direction indicator lever even if no overtaking information is presented.

Examples of the overtaking proposal condition include, but are not limited to, a condition in which all of the following conditions are satisfied:

The lane keeping mode is carried out in a hands-off mode;
The vehicle is traveling at a speed of 60 km/h or more;
There is a lane in the lane change direction;
The lane as the lane change destination includes a space to which a lane change is possible after 5 seconds;
The type of lane markers indicates that a lane change is permitted;
The radius of curvature of the road is 250 m or more;
The speed of the subject vehicle is slower than the set speed by 5 km/h or more;
The speed of the preceding vehicle is slower than the set speed by 10 km/h or more;
The distance between the subject vehicle and the preceding vehicle is less than a threshold that is preliminarily set based on the speed difference between the subject vehicle and the preceding vehicle; and The speed of the preceding vehicle present in the lane as the lane change destination satisfies a predetermined condition.

The lane keeping mode in the hands-off mode, which will be described later in detail, refers to a mode in which the autonomous speed control with the speed control unit 41 and the lane keeping control with the lane keeping unit 421 are being executed and the holding of the steering wheel by the driver is not necessary. The condition that the speed of the preceding vehicle present in the lane as the lane change destination satisfies a predetermined condition is applied differently depending on the type of the lane as the lane change destination. For example, when changing lanes from the left-side lane to the right-side lane on a multi-lane road with left-hand traffic, the condition is that the speed of the subject vehicle present in the left-side lane is higher than the speed of the preceding vehicle present in the right-side lane by about 5 km/h or more. On the contrary, when changing lanes from the right-side lane to the left-side lane on a multi-lane road with left-hand traffic, the condition is that the speed difference between the subject vehicle and the preceding vehicle in the left-side lane is within about 5 km/h. The conditions regarding the relative speed difference between the subject vehicle and the preceding vehicle are reversed on a right-hand traffic road.

When the driver accepts the presentation of the overtaking information and a predetermined overtaking start condition that is preliminarily set is satisfied, the travel assistance device 19 uses the overtaking assist control with the overtaking unit 423 to turn on the direction indicators and starts the LCP. Examples of the overtaking start condition include, but are not limited to, a condition in which all of the following conditions are satisfied:

The lane keeping mode is carried out in the hands-on mode;
Hands-on determination is made;
The vehicle is traveling at a speed of 60 km/h or more;
There is a lane in the lane change direction;
The lane as the lane change destination includes a space to which a lane change is possible;
The type of lane markers indicates that a lane change is permitted;
The radius of curvature of the road is 250 m or more;
The speed of the subject vehicle is slower than the set speed by 5 km/h or more (when changing lanes to the right-side lane in a left-hand traffic);
The speed of the preceding vehicle is slower than the set speed by 10 km/h or more (when changing lanes to the right-side lane in a left-hand traffic);
The speed of the preceding vehicle present in the lane as the lane change destination satisfies a predetermined condition; and
The elapsed time after the operation of the lane change assist switch 176 is within 10 seconds.

The condition that the speed of the preceding vehicle is slower than the set speed by 10 km/h or more can be changed by the driver's setting, and the set speed after the change represents the overtaking start condition. As the speed that can be changed, for example, 15 km/h and 20 km/h can be selected in addition to 10 km/h. The condition that the speed of the preceding vehicle present in the lane as the lane change destination satisfies a predetermined condition is the same as that in the above-described overtaking proposal condition.

Figure 5:
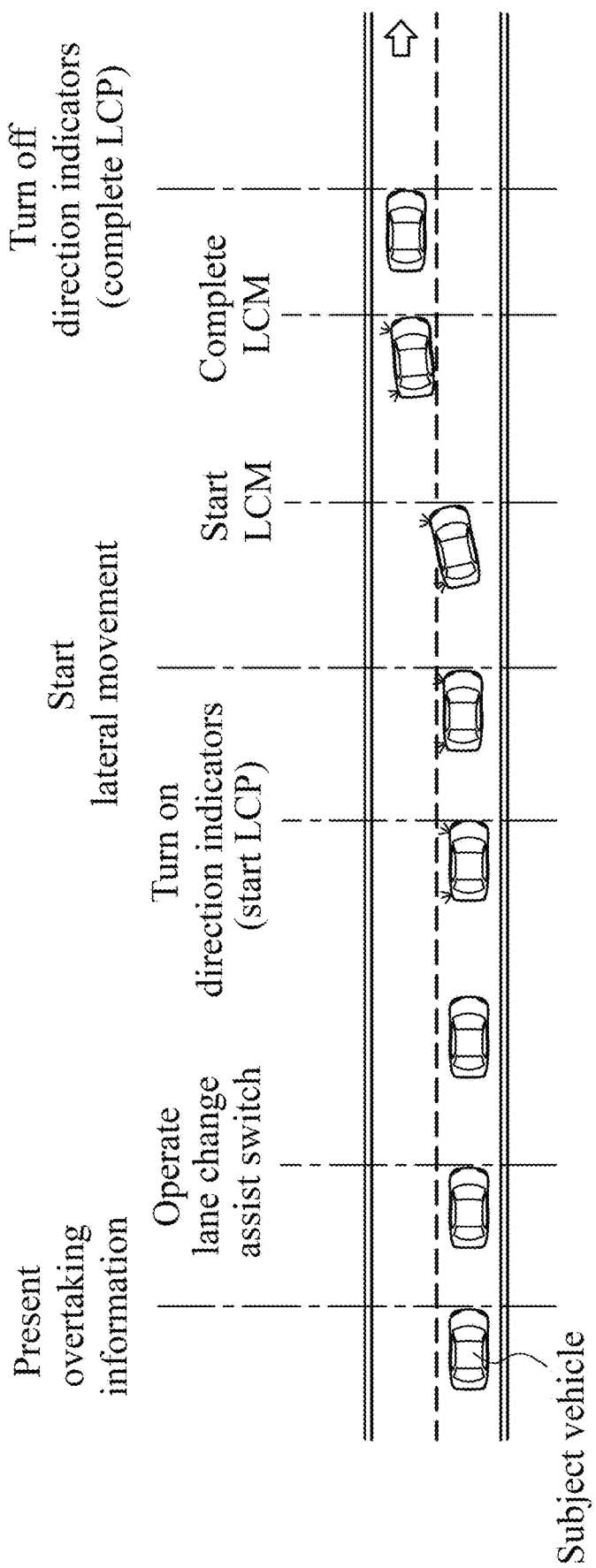
FIG. 5 is a plan view illustrating a lane change to the original travel lane using the autonomous lane change control.

When the overtaking start condition is satisfied, the travel assistance device 19 starts the LCP with the overtaking assist control and executes the lateral movement to an adjacent lane and the LCM. During the execution of the LCP, the travel assistance device 19 uses the overtaking assist control to allow the output device 18 to present the driver with information indicating that the lane change is performed in an automated or autonomous manner, and also calls attention to the surroundings. When the LCM is concluded, the travel assistance device 19 turns off the direction indicators and starts the lane keeping control with the lane keeping unit 421 in the adjacent lane. In addition, the overtaking unit 423 has a function of controlling the output device 18 to propose to return to the original lane to the driver when the overtaking proposal condition is satisfied again after overtaking the preceding vehicle. When the driver accepts this proposal by operating the lane change assist switch 176 of the input device 17 and the overtaking start condition is satisfied, the travel assistance device 19 uses the overtaking assist control to start the LCP so that, as illustrated in FIG. 5, the subject vehicle returns to the original lane.

The route traveling unit 424 has a function of controlling the subject vehicle to travel along a set travel route. The route traveling unit 424 uses the route traveling assist control to allow the subject vehicle to travel along a set travel route. That is, the route traveling assist control is a type of the autonomous lane change control, and is the autonomous lane change control in a travel scene in which the subject vehicle travels along a set travel route. When there is a traveling direction change point such as a branching point, a merging point, an exit, or a toll gate on the set travel route, the distance to the traveling direction change point is within a predetermined distance, and a predetermined route traveling proposal condition is satisfied, the travel assistance device 19 uses the function of the route traveling unit 424 to control the output device 18 to present the route traveling information and also proposes a lane change to the traveling direction change point. In addition, the travel assistance device 19 starts the LCP when the proposal of the lane change is accepted through the operation of the lane change assist switch 176 and a predetermined route traveling start condition is satisfied. Here, the operation of the lane change assist switch 176 may be an operation of the direction indicator lever by the driver. The travel assistance device 19 determines, based on various travel information items acquired with the travel information acquisition function of the acquisition unit 3, whether or not the route traveling proposal condition and the route traveling start condition are satisfied.

When the travel route is set by the navigation device 15, but the route traveling assist control with the route traveling unit 424 is not executed or is disabled in the setting, the navigation device 15 executes a normal navigation that guides the travel route. The route traveling assist control may include a function of starting the LCP for traveling along the travel route when the driver operates the direction indicator lever even if no lane change is proposed with the route traveling information.

Figure 6:
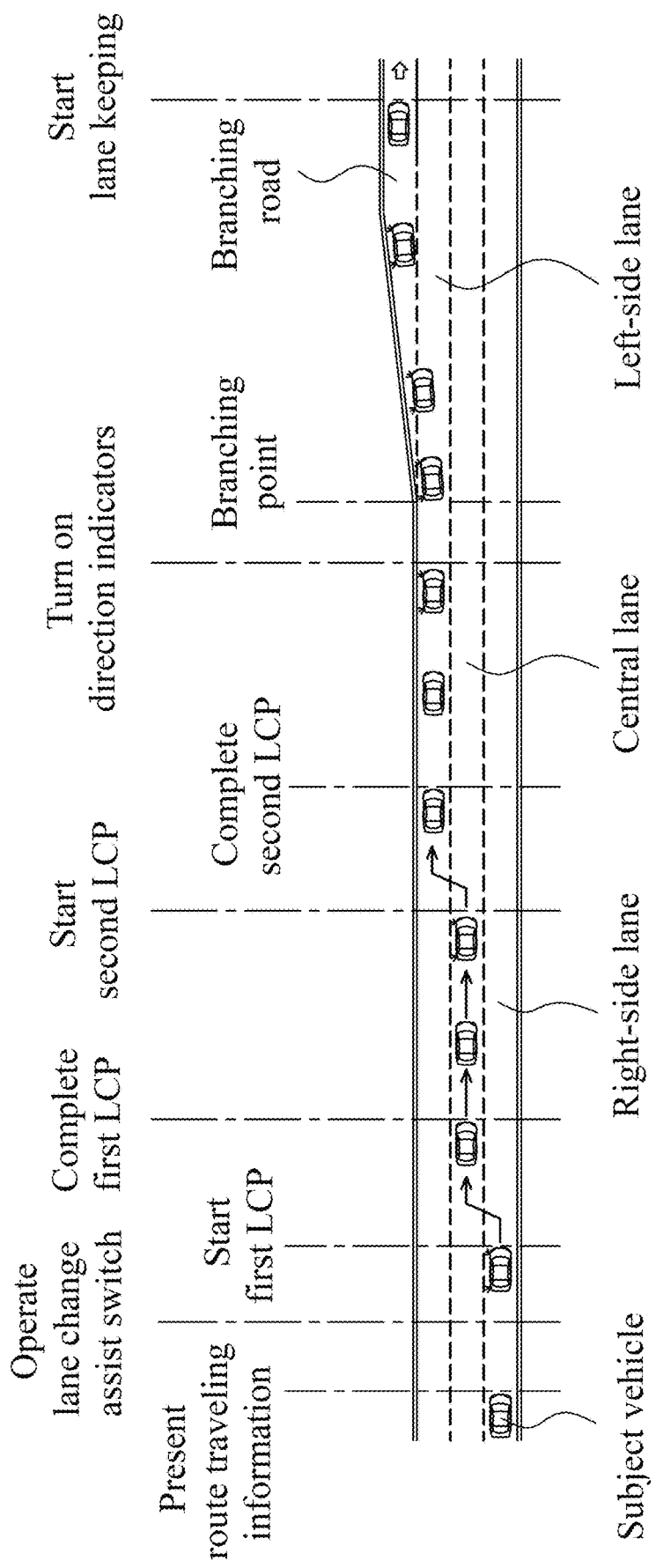
FIG. 6 is a plan view illustrating lane changes using route traveling assist control.

FIG. 6 illustrates an example in which when traveling in the right-side lane on a left-hand traffic road with three lanes on each side, the subject vehicle sequentially changes lanes twice toward a branching point existing in the left-side lane and moves from the branching point to a branch road (also referred to as a branch line, here and hereinafter) extending on the left side of the left-side lane. When the location is within a first predetermined distance to the branching point (e.g., about 2.5 km to 1.0 km before the branching point) and the route traveling proposal condition is satisfied, the travel assistance device 19 uses the route traveling assist control with the route traveling unit 424 to propose a lane change from the right-side lane to the central lane based on the route traveling information. The first predetermined distance (also referred to as a lane change proposal section) is preliminarily set in accordance with the number of lane changes required to move to the lane in which the traveling direction change point is present. For example, as illustrated in FIG. 6, when it is necessary to change lanes twice from the right-side lane to the left-side lane via the central lane, the section of 2.5 km to 1.0 km before the branching point represents the first predetermined distance (lane change proposal section).

Examples of the route traveling proposal condition include, but are not limited to, a condition in which all of the following conditions are satisfied:

A destination is set by the navigation device 15;
   The lane keeping mode is carried out in the hands-off mode;
   The vehicle is traveling at a speed of 60 km/h or more;
   There is a lane in the lane change direction;
   The type of lane markers indicates that a lane change is permitted; and
   The radius of curvature of the road is 250 m or more.

In the route traveling proposal condition, even when the lane as the lane change destination does not include a space to which a lane change is possible, the route traveling information is presented in order to notify the driver that a lane change along the travel route is necessary.

When the driver accepts the lane change for heading to the branching point and the route traveling start condition is satisfied, the travel assistance device 19 uses the route traveling assist control with the route traveling unit 424 to turn on the direction indicators to start the LCP. Examples of the route traveling start condition include, but are not limited to, a condition in which all of the following conditions are satisfied:

The lane keeping mode is carried out in the hands-on mode;
   Hands-on determination is made;
   The vehicle is traveling at a speed of 60 km/h or more;
   There is a lane in the lane change direction;
   The lane as the lane change destination includes a space to which a lane change is possible;
   The type of lane markers indicates that a lane change is permitted;
   The vehicle is traveling in the lane change proposal section; and
   The radius of curvature of the road is 250 m or more.

When the route traveling start condition is satisfied, the travel assistance device 19 uses the route traveling assist control with the route traveling unit 424 to start the LCP and execute the lateral movement to the central lane and the LCM. When the LCM is concluded, the travel assistance device 19 turns off the direction indicators and starts the lane keeping control with the lane keeping unit 421 in the central lane. During the execution of the LCP, the travel assistance device 19 uses the route traveling assist control to operate the output device 18 to present the driver with information indicating that the lane change is performed in an automated or autonomous manner and also calls attention to the surroundings.

As illustrated in FIG. 6, during the execution of the lane keeping control in the central lane, when the location is within a second predetermined distance to the branching point (e.g., about 2.3 km to 700 m before the branching point) and the route traveling start condition is satisfied, the travel assistance device 19 uses the route traveling assist control to turn on the direction indicators to start the second LCP and perform the lane change from the central lane to the left-side lane. When the second LCM is concluded, the travel assistance device 19 turns off the direction indicators and starts the lane keeping control with the lane keeping unit 421 in the left-side lane.

During the execution of the lane keeping control in the left-side lane, when the location is within a third predetermined distance to the branching point (e.g., about 800 m to 150 m before the branching point) and the route traveling start condition is satisfied, the travel assistance device 19 uses the route traveling assist control to turn on the direction indicators. The travel assistance device 19 uses the route traveling assist control with the route traveling unit 424 to start the steering control from a point beyond the branching point to the branch road and perform a lane change from the left-side lane to the branch road. The above-described autonomous steering control is used for the steering control. When the lane change to the branch road is concluded, the travel assistance device 19 turns off the direction indicators and starts the lane keeping control with the lane keeping unit 421 in the branch road.

Figure 7:
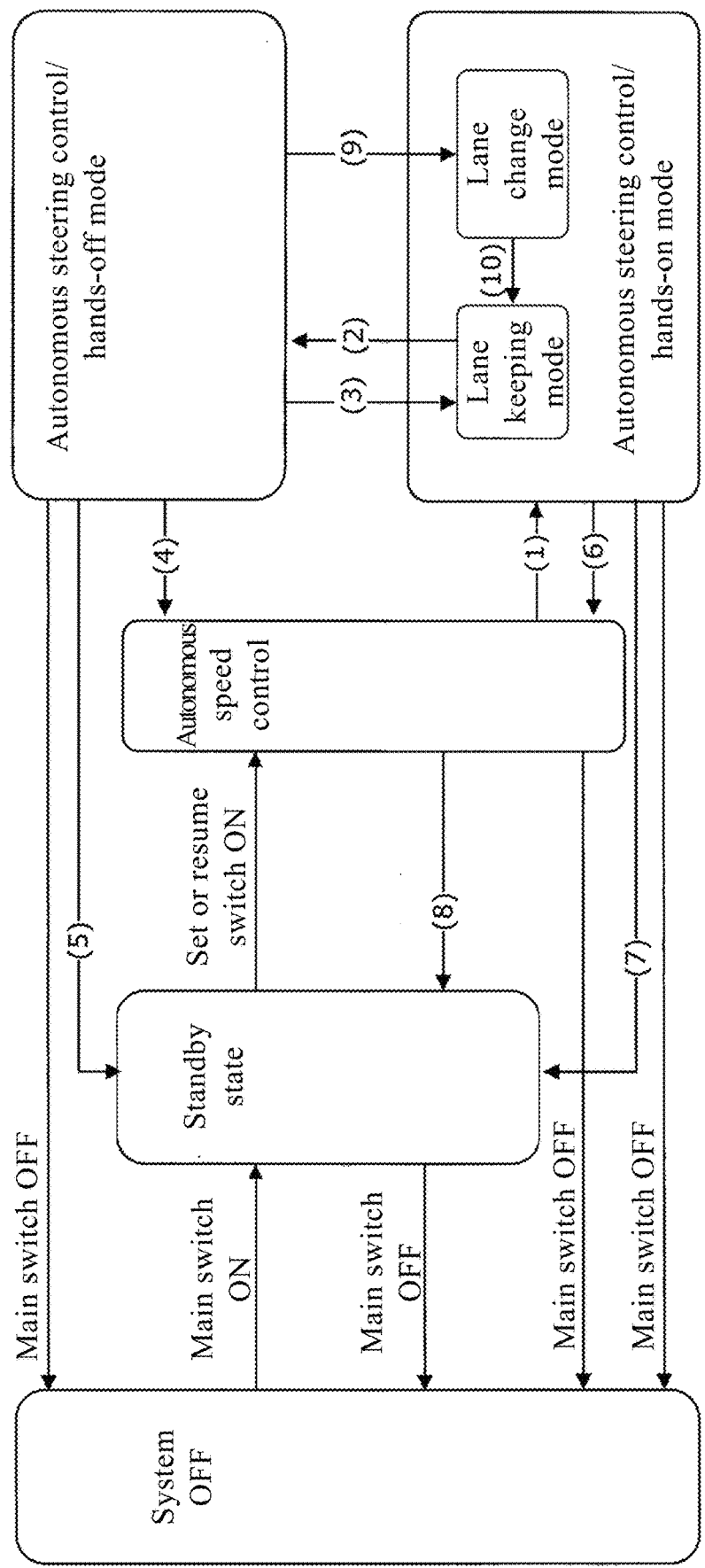
FIG. 7 is a block diagram illustrating a state transition of the travel assistance device of FIG. 1.

FIG. 7 is a block diagram illustrating a state transition of each function established in the travel assistance device 19. The system illustrated in FIG. 7 means an autonomous travel control system realized by the travel assistance device 19. When the main switch 171 of FIG. 2 is turned ON from the system OFF state illustrated in FIG. 7, the system comes to a standby state. From this standby state, the autonomous speed control with the autonomous speed control function is activated by turning ON the set/coast switch 173 or resume/acceleration switch 172 of FIG. 2. This allows the above-described constant speed control or inter-vehicle distance control to be started, and the driver can drive the subject vehicle simply by operating the steering wheel without stepping on the accelerator or the brake.

During the execution of the autonomous speed control, when the condition (1) of FIG. 7 is satisfied, the mode transitions to the lane keeping mode of the autonomous steering control/hands-on mode. Examples of the condition (1) include, but are not limited to, a condition in which all of the following conditions are satisfied:

Lane markers on both sides of the subject vehicle are being detected;
   The driver is holding the steering wheel;
   The vehicle is traveling near the center of the lane;
   The direction indicators are not operating;
   The windshield wiper is not operating at a high speed (HI); and
   When a high-precision map is provided, there is not a tollgate, an exit, a merging point, an intersection, or a point at which the number of lanes decreases, within about 200 m ahead.

The hands-on mode refers to a mode in which the autonomous steering control with the autonomous steering control function does not operate unless the driver holds the steering wheel, while the hands-off mode refers to a mode in which the autonomous steering control with the autonomous steering control function operates even when the driver releases the steering wheel. The holding of the steering wheel by the driver is detected using a touch sensor of the onboard sensor 163.

During the execution of the lane keeping mode of the autonomous steering control/hands-on mode, when the condition (2) of FIG. 7 is satisfied, the mode transitions to the lane keeping mode of the autonomous steering control/ hands-off mode. Examples of the condition (2) include a condition in which all of the following conditions are satisfied:

The subject vehicle is traveling on an automobile-only road;

The vehicle is traveling on a road that is structurally separated from the oncoming lane;

The vehicle is traveling on a road for which a high-precision map is prepared;

The vehicle is traveling at a speed that is not higher than the speed limit;

GPS signals are enabled;

The driver is holding the steering wheel;

The driver is facing forward;

There is not a tollgate, an exit, a merging point, an intersection, or a point at which the number of lanes decreases, within about 800 m ahead;

There is not a sharp curve of 100 R or less within about 500 m ahead;

The vehicle is not traveling in a tunnel that exceeds 500 m from the tunnel entrance; and The accelerator pedal is not depressed.

Whether or not the driver is facing forward is determined, for example, based on an image captured by a driver monitor camera of the imaging device 11.

On the contrary, during the execution of the lane keeping mode of the autonomous steering control/hands-off mode, when the condition (3) of FIG. 7 is satisfied, the mode transitions to the lane keeping mode of the autonomous steering control/hands-on mode. Examples of the condition (3) include, but are not limited to, a condition in which any of the following conditions is satisfied:

The subject vehicle is traveling on a road other than an automobile-only road;

The vehicle is traveling in a two-way traffic section;

The vehicle is traveling on a road for which no high-precision map is prepared;

The vehicle is traveling at a speed higher than the speed limit;

GPS signals can no longer be received;

The driver does not face forward within 5 seconds after a forward gaze alarm is activated;

The driver monitor camera can no longer detect the driver;

There is any of a tollgate, an exit, a merging point, an intersection, or a point at which the number of lanes decreases, within about 800 m ahead;

When traveling at a vehicle speed of less than about 40 km/h, there is a sharp curve of 100 R or less within about 200 m ahead;

When traveling at a vehicle speed of about 40 km/h or more, there is a sharp curve of 170 R or less within about 200 m ahead;

The vehicle is traveling in a tunnel that exceeds 500 m from the tunnel entrance;

The driver is stepping on the accelerator pedal while holding the steering wheel; and An approaching alarm is operating.

During the execution of the lane keeping mode of the autonomous steering control/hands-off mode, when the condition (4) of FIG. 7 is satisfied, the autonomous steering control is stopped and transitions to the autonomous speed control. Examples of the condition (4) include, but are not limited to, a condition in which any of the following conditions is satisfied:

Lane markers on both sides of the subject vehicle are no longer detected for a certain period of time;

The driver is operating the steering wheel; and

The windshield wiper is operating at a high speed (HI).

The driver's steering wheel operation is determined by detecting with the onboard sensor 163 the torque applied to the steering wheel.

During the execution of the lane keeping mode of the autonomous steering control/hands-off mode, when the condition (5) of FIG. 7 is satisfied, the autonomous steering control and the autonomous speed control are stopped and transition to the standby state. Examples of the condition (5) include, but are not limited to, a condition in which any of the following conditions is satisfied:

The driver has operated the brake;

The driver has operated the cancel switch 174 of FIG. 2;

One or more doors of the subject vehicle have opened;

The driver's seat belt has been released;

The seating sensor has detected that the driver is no longer on the driver's seat;

The select lever has come to other than "D" or ""M";

The parking brake has been operated;

The antiskid brake system of the vehicle has been turned OFF;

The antiskid brake system has operated;

The snow mode has been turned ON;

The emergency brake has operated;

The stop state continues for about 3 minutes after the vehicle has stopped due to the vehicle speed control;

The front camera has detected poor visibility such as being unable to correctly recognize an object due to dirt, backlight, rain/fog, or the like;

The front radar has detected shielding or radio disturbance;

The front radar has detected an axis deviation;

The side radar has detected shielding or radio disturbance; and

The side radar has detected an axis deviation.

During the execution of the autonomous steering control/hands-on mode, when the condition (6) of FIG. 7 is satisfied, the autonomous steering control is stopped and transitions to the autonomous speed control. Examples of the condition (6) include, but are not limited to, a condition in which any of the following conditions is satisfied:

Lane markers on both sides of the subject vehicle are no longer detected;

The driver has operated the steering wheel;

The driver has operated the direction indicator lever;

The windshield wiper has operated at a high speed (HI)

The vehicle has come to a tollgate section when a high-precision map is prepared; and The front camera has detected poor visibility such as being unable to correctly recognize an object due to dirt, backlight, rain/fog, or the like.

During the execution of the autonomous steering control/hands-on mode, when the condition (7) of FIG. 7 is satisfied, the autonomous steering control and the autonomous speed control are stopped and transition to the standby state. Examples of the condition (7) include, but are not limited to, a condition in which any of the following conditions is satisfied:

The driver has operated the brake;

The driver has operated the cancel switch 174 of FIG. 2;

One or more doors of the subject vehicle have opened;

The driver's seat belt has been released;

The seating sensor has detected that the driver is no longer on the driver's seat;

The select lever has come to other than "D" or ""M";

The parking brake has been operated;

The antiskid brake system of the vehicle has been turned OFF;

The antiskid brake system has operated;

The snow mode has been turned ON;

The emergency brake has operated;

The stop state continues for about 3 minutes after the vehicle has stopped due to the vehicle speed control;

The front radar has detected shielding or radio disturbance; and

The front radar has detected an axis deviation.

During the execution of the autonomous speed control, when the condition (8) of FIG. 7 is satisfied, the control transitions to the standby state. Examples of the condition (8) include, but are not limited to, a condition in which any of the following conditions is satisfied:

The driver has operated the brake;

The driver has operated the cancel switch 174 of FIG. 2;

One or more doors of the subject vehicle have opened;

The driver's seat belt has been released;

The seating sensor has detected that the driver is no longer on the driver's seat;

The select lever has come to other than "D" or ""M";

The parking brake has been operated;

The antiskid brake system of the vehicle has been turned OFF;

The antiskid brake system has operated;

The snow mode has been turned ON;

The emergency brake has operated;

The stop state continues for about 3 minutes after the vehicle has stopped due to the vehicle speed control;

The front radar has detected shielding or radio disturbance; and

The front radar has detected an axis deviation.

During the execution of the lane keeping mode of the autonomous steering control/hands-off mode, when the condition (9) of FIG. 7 is satisfied, the mode transitions to a lane change mode of the autonomous steering control/hands-on mode. Examples of the condition (9) include, but are not limited to, a condition in which any of the following conditions is satisfied:

The system has proposed a lane change based on the overtaking assist control with the overtaking unit 423 or the route traveling assist control with the route traveling unit 424 and the driver has operated the lane change assist switch 176; and The driver has operated the direction indicator lever to execute the autonomous lane change control.

During the execution of the lane change mode of the autonomous steering control/hands-on mode, when the condition (10) of FIG. 7 is satisfied, the mode transitions to the lane keeping mode of the autonomous steering control/hands-on mode. Examples of the condition (10) include, but are not limited to, a condition in which any of the following conditions is satisfied:

The speed limit has been exceeded before the start of the LCP;

The driver has stepped on the accelerator pedal while holding the steering wheel before the start of the LCP;

The LCP can no longer be started within 10 seconds after pressing the lane change assist switch 176 during the proposal of a lane change when there is a slow car ahead;

The LCP can no longer be started and the vehicle has come too close to the branching point after pressing the lane change assist switch 176 during the proposal of a lane change to travel along the travel route;

The LCM can no longer be started within 5 seconds after the LCP has operated;

The vehicle speed has fallen below about 50 km/h after starting the LCP and before starting the LCM;

There is no longer a space in the adjacent lane required to change lanes after operating the LCP and before starting the LCM;

The driver has performed a cancel operation before starting the LCM;

Lane markers can no longer be detected before starting the LCM;

A determination has been made before starting the LCM that there is no adjacent lane in the direction of changing lanes or there will be no adjacent lane within a certain distance ahead;

A determination has been made before starting the LCM that there is a curve with a radius of curvature of 250 m or more within a certain distance ahead;

A determination has been made before starting the LCM that there is a section within a certain distance ahead in which the type of lane marking prohibits a lane change to the adjacent lane;

The side radar has detected shielding or radio disturbance before starting the LCM;

The side radar has detected an axis deviation before starting the LCM;

The hands-on alarm has operated;

The driver has stopped the direction indicators; and

The LCP has been concluded.

The hands-on alarm operates when any of the following conditions is satisfied:

The driver does not hold the steering wheel within about 2 seconds after the LCP has operated;

The driver does not hold the steering wheel within about 2 seconds after pressing the lane change assist switch 176 during the proposal of a lane change when there is a slow car ahead; and The driver does not hold the steering wheel within about 2 seconds after pressing the lane change assist switch 176 during the proposal of a lane change to travel along the travel route.

The system is turned OFF when the main switch 171 is turned OFF in any of the autonomous steering control/hands-off mode, the autonomous steering control/hands-on mode, the autonomous speed control, and the standby state.

Figure 8:
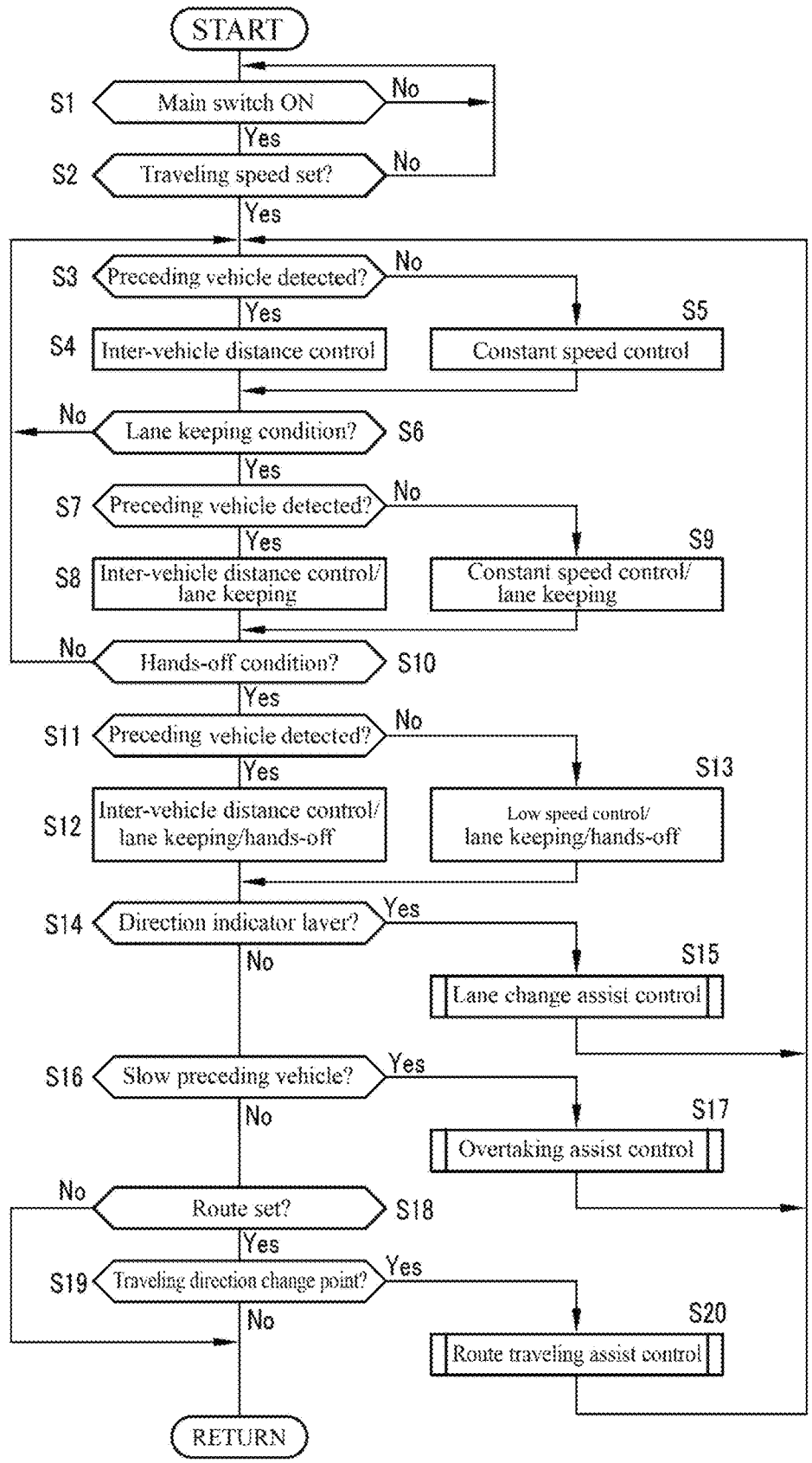
FIG. 8 is a flowchart illustrating an example of the procedure of information processing in the travel assistance system of FIG. 1.

The travel control process according to the present embodiment will now be described with reference to FIG. 8. FIG. 8 is an example of a flowchart illustrating the travel control process according to the present embodiment. The travel assistance device 19 executes the travel control process, which will be described below, at predetermined time intervals. The following description will be made on the assumption that the travel assistance device 19 uses the function of the speed control unit 41 to execute the autonomous speed control and also uses the function of the steering control unit 42 to execute the autonomous steering control. It is also assumed that the travel assistance device 19 uses the function of the lane changing unit 422 to execute the lane change assist control, uses the function of the overtaking unit 423 to execute the overtaking assist control, and uses the function of the route traveling unit 424 to execute the route traveling assist control.

First, in step S1 of FIG. 8, a determination is made as to whether or not the main switch 171 of the travel assistance device 19 is ON, and when the main switch 171 is OFF, step S1 is repeated until the main switch 171 is turned ON. When the main switch 171 is ON, the process proceeds to step S2, in which a determination is made as to whether or not the traveling speed is set by the driver. When the traveling speed is not set, the process returns to step S1, from which steps S1 and S2 are repeated until the traveling speed is set. The setting of the traveling speed is performed by the driver operating the resume/acceleration switch 172 or set/coast switch 173 of the input device 17 illustrated in FIG. 2 to input a desired traveling speed.

When the traveling speed is set, the autonomous speed control is started. In step S3, the front radar, which is the ranging device 12, is used to detect whether or not there is a preceding vehicle ahead of the subject vehicle in its traveling lane, and when there is a preceding vehicle, the process proceeds to step S4, in which the inter-vehicle distance control is executed. When there is no preceding vehicle, the process proceeds to step S5, in which the constant speed control is executed. This allows the driver to drive the subject vehicle at a desired speed simply by operating the steering wheel without stepping on the accelerator or the brake.

During the execution of the inter-vehicle distance control in step S4 or the constant speed control in step S5, a determination is made in step S6 as to whether or not the above-described condition (1) for transitioning to the lane keeping mode of the autonomous steering control/hands-on mode is satisfied. When the condition (1) is satisfied, the process proceeds to step S7, while when the condition (1) is not satisfied, the process returns to step S3.

In step S7, the front radar (ranging device 12) which detects an obstacle ahead of the subject vehicle is used to detect whether or not there is a preceding vehicle ahead of the subject vehicle in its traveling lane. When there is a preceding vehicle, the process proceeds to step S8, in which the inter-vehicle distance control/lane keeping mode is executed. When there is no preceding vehicle, the process proceeds to step S9, in which the constant speed control/lane keeping mode is executed.

During the execution of the inter-vehicle distance control/lane keeping mode in step S8 or the constant speed control/lane keeping mode in step S9, a determination is made in the subsequent step S10 as to whether or not the above-described condition (2) for transitioning to the autonomous steering control/hands-off mode is satisfied. When the condition (2) is satisfied, the process proceeds to step S11, while when the condition (2) is not satisfied, the process returns to step S3. In step S11 in which the condition (2) for transitioning to the autonomous steering control/hands-off mode is satisfied, the front radar (ranging device 12) which detects an obstacle ahead of the subject vehicle is used to detect whether or not there is a preceding vehicle ahead of the subject vehicle in its traveling lane. When there is a preceding vehicle, the process proceeds to step S12, in which the inter-vehicle distance control/lane keeping mode/hands-off is executed. When there is no preceding vehicle, the process proceeds to step S13, in which the constant speed control/lane keeping mode/hands-off is executed.

In step S14, a determination is made as to whether or not the direction indicator lever has been operated by the driver. When the direction indicator lever has been operated, the condition (9) for transitioning to the lane changing mode of the autonomous steering control/hands-on mode is satisfied, and the process proceeds to step S15. In step S15, the lane change assist control is executed. When the lane change assist control in step S15 is concluded, the process returns to step S3. When the direction indicator lever has not been operated by the driver in step S14, the process proceeds to step S16.

In step S16, a determination is made as to whether or not there is a preceding vehicle slower than the set speed. When there is a preceding vehicle slower than the set speed, a determination is made as to whether or not the condition (9) is satisfied, and when the condition (9) is satisfied, the mode transitions to the lane change mode of the autonomous steering control/hands-on mode, and the process proceeds to step S17. In step S17, the overtaking assist control is executed. When the overtaking assist control in step S17 is concluded, the process returns to step S3. When there is no preceding vehicle slower than the set speed in step S16, the process proceeds to step S18.

In step S18, a determination is made as to whether a travel route to the destination is set in the navigation device 15. When no travel route is set, the process returns to step S1. When a travel route to the destination is set in the navigation device 15 in step S18, the process proceeds to step S19. In step S19, a determination is made as to whether or not a predetermined distance to the traveling direction change point such as a branching point existing on the travel route is reached. When the predetermined distance to the traveling direction change point is reached in step S19, a determination is made as to whether or not the condition (9) is satisfied, and when the condition (9) is satisfied, the mode transitions to the lane change mode of the autonomous steering control/hands-on mode, and the process proceeds to step S20. In step S20, the route traveling assist control is executed. When the route traveling assist control in step S20 is concluded, the process returns to step S3. When the predetermined distance to the traveling direction change point is not reached in step S19, the process returns to step S1.

In the flowchart of FIG. 8, the necessities of the lane change assist control, the overtaking assist control, and the route traveling assist control are determined in this order, but in practice, the necessities of these control procedures are determined in parallel, and when, during any of the assist control procedures is being executed, it becomes necessary to execute another assist control procedure, the necessity of execution is arbitrated between the assist control procedures, and the assist control to be executed preferentially is determined.

<Route Traveling Assist Control>

Figure 9:
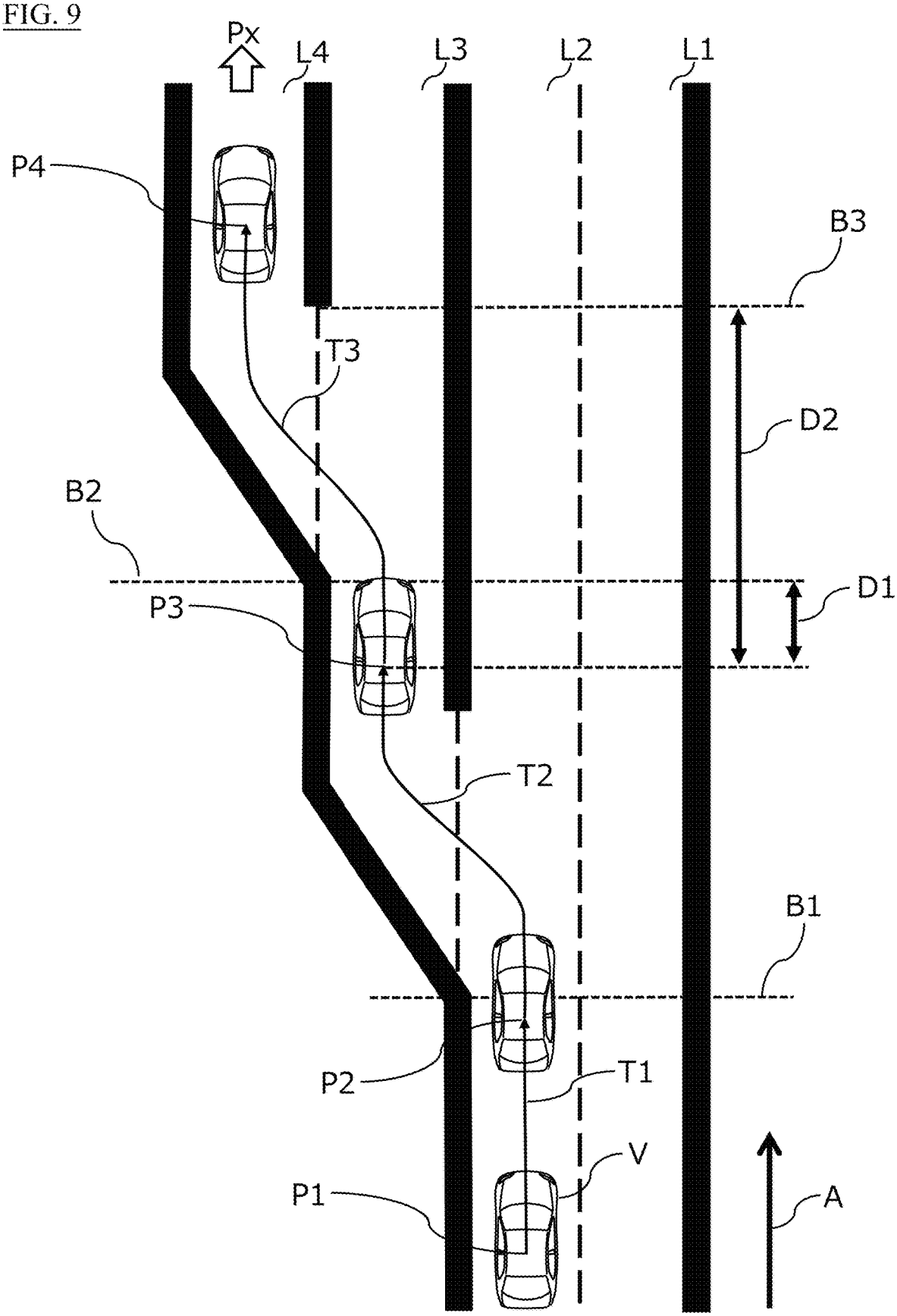
FIG. 9 is a plan view illustrating an example of a travel scene in which the autonomous travel control is executed using the travel assistance system illustrated in FIG. 1.

The route traveling assist control of the present embodiment will be described with reference to FIG. 9. FIG. 9 is a plan view illustrating an example of a travel scene in which the autonomous travel control is performed using the travel assistance system 1. The traveling direction of the vehicle on the road illustrated in FIG. 9 is the direction from the lower side to the upper side of the drawing as indicated by arrow A at the lower right of FIG. 9. The road illustrated in FIG. 9 has a lane L1 on the right side of the traveling direction and a lane L2 on the left side of the traveling direction. The lane L2 branches at a branching position B1 into the lane L2 which is the main line and a lane L3 which is a branch line. The lane L3, which is a branch line, branches into a lane L3 and a lane L4 at a branching position B2.

In the travel scene illustrated in FIG. 9, it is assumed that the subject vehicle V is traveling at a position P1 in the lane L2. It is also assumed that a destination Px set by the driver is located ahead in the traveling direction of the lane L4, and that the travel route toward the destination Px is set by the navigation device 15. In this case, in order to travel along the travel route, the subject vehicle V has to change lanes from the lane L2 to the lane L3 to enter the lane L3 which is a branch line, and further change lanes from the lane L3 to the lane L4 to enter the lane L4. In order for the subject vehicle V to enter the lane L4, for example, the travel assistance device 19 controls the subject vehicle V to: travel from the position P1 to the position P2 along a trajectory T1; start the first LCP at a position P2 in the lane L2; travel along a trajectory T2; conclude the LCP at a position P3 in the lane L3; start the second LCP at the position P3 in the lane L3; travel along a trajectory T3; and conclude the LCP at a position P4 in the lane L4.

Thus, when entering from a certain branch line (e.g., the branch line L3 of FIG. 9) into another branch line (e.g., the branch line L4 of FIG. 9) that is further branched, lane changes have to be performed twice (or three times or more) in succession. When all the lane changes can be assisted by the autonomous lane change control, the travel assistance device 19 may sequentially execute the lane changes using the autonomous lane change control. However, when the lane changes are performed twice in succession, for example, if only the second lane change cannot be assisted by the autonomous lane change control, then only the second lane change will be performed by the driver in a manual operation. In the following description, a lane change using the autonomous lane change control will also be simply referred to as an "autonomous lane change."

There are two possible cases in which a lane change cannot be assisted by the autonomous lane change control. That is, one is a case (a) in which the conditions for enabling (activating) the autonomous lane change control are satisfied, but the lane change itself cannot be executed due to reasons such as the presence of an obstacle in the lane to which the lane change is to be performed, and the other is a case (b) in which the conditions for enabling the autonomous lane change control are not satisfied in the first place. In the case (a), the driver expects that the autonomous lane change will be executed, so when the travel assistance device 19 determines that the lane change cannot be performed due to an obstacle or the like, the driver is notified that the autonomous lane change cannot be executed. The output device 18 is used for the notification. The driver notified that the autonomous lane change cannot be executed can attempt a second lane change (lane change from the lane L3 to the lane L4) in a manual operation.

On the other hand, in the case (b), even when a determination is made that the autonomous lane change cannot be executed, the travel assistance device 19 does not notify the driver that the autonomous lane change cannot be executed. When the conditions for enabling (activating) the autonomous lane change control are not satisfied, the assistance by the autonomous lane change control with the lane changing unit 422, overtaking unit 423, and route traveling unit 424 of the travel assistance device 19 is not enabled in the first place, and the driver is therefore not notified whether or not the autonomous lane change can be executed. In such a state, the driver usually does not expect to execute the autonomous lane change. In other words, if the driver who does not expect to execute the autonomous lane change is notified that the autonomous lane change cannot be executed, the driver will be confused as to why he/she is notified of something obvious, leading to the occurrence of strange or uncomfortable feeling.

However, as in the travel scene illustrated in FIG. 9, when entering the lane L4 via the lane L3 from the lane L2 which is the main line, at the stage in which the first lane change (lane change from the lane L2 to the lane L3) is executed using the autonomous lane change control, the driver expects that the second lane change (lane change from the lane L3 to the lane L4) will also be executed using the autonomous lane change control. In particular, in a travel scene in which lane changes are repeated over a relatively short period of time, it is difficult to notify the driver whether or not the autonomous lane change is possible for each lane change, so even when the conditions for enabling the autonomous lane change control are not satisfied for the second lane change, the driver expects that the second lane change will be executed using the autonomous lane change control in the same way as the first lane change.

On the other hand, when the conditions for enabling the autonomous lane change control are not satisfied, the travel assistance device 19 does not notify the driver that the autonomous lane change is not possible, in order to avoid notifying the driver of something obvious. Then, by the lane keeping control with the lane keeping unit 421, the subject vehicle V traveling in the lane L3 is controlled to travel straight ahead. Therefore, even when the subject vehicle V passes the branching position B2, it will continue to travel straight ahead in the lane L3, and unless the driver makes a manual operation, the second lane change (lane change from the lane L3 to the lane L4) is not performed. Furthermore, even when the driver realizes that it is necessary to perform the second lane change in a manual operation at the stage in which the subject vehicle V has passed the branching point B2, it is not possible to ensure the travel distance to perform a lane change, and the second lane change cannot be concluded.

Accordingly, in the route traveling assist control of the present embodiment, the functions of the determination unit 5 and notification unit 6 are used in addition to the functions of the acquisition unit 3 and assistance unit 4 thereby to suppress the uncomfortable feeling given to the driver caused by the discrepancy between the autonomous travel control expected by the driver (in particular, the lane change with the autonomous lane change control) and the actual autonomous travel control. The functions of the determination unit 5 and notification unit 6 will be described below.

The determination unit 5 has a function of determining whether or not it is necessary to perform the second lane change in order to travel along the set travel route after performing the first lane change with the autonomous lane change control for performing lane changes by the autonomous travel control in a travel scene of performing two or more lane changes in succession, such as a travel scene of entering from a certain branch line into another branch line that is further branched. Performing two or more lane changes in succession means sequentially performing lane changes two or more times, and it is not necessary for the vehicle to keep moving in a direction perpendicular to the traveling direction (also referred to as a "lateral direction," hereinafter). That is, straight traveling using the lane keeping control with the lane keeping unit 421 may be included between a certain lane change and the next lane change. Note that the first lane change may be a lane change for traveling along a set travel route.

The travel route for the subject vehicle V to travel to the destination is generated by the navigation device 15. The travel assistance device 19 obtains the travel route from the navigation device 15 using the function of the determination unit 5. Then, the travel assistance device 19 determines, based on the acquired travel route, the map information 13, and the information on the current position of the subject vehicle V acquired from the subject vehicle position detection device 14, whether or not it is necessary to perform a lane change.

Specifically, first, the travel assistance device 19 determines, based on the road information of the map information 13 and the information on the current position of the subject vehicle V, whether or not the number of lanes on the road increases ahead in the traveling direction of the road on which the subject vehicle V travels. For example, when the road on which the subject vehicle V travels branches into a main line and a branch line ahead of the current position of the subject vehicle V, the travel assistance device 19 determines that the number of lanes on the road increases. As another example, when another lane merges with the main line, on which the subject vehicle V travels, ahead of the current position of the subject vehicle V, the travel assistance device 19 determines that the number of lanes on the road increases. As still another example, when there is an intersection ahead of the subject vehicle V and the lane in which the subject vehicle V travels branches into a straight-ahead lane and a right-turn lane before the intersection, the travel assistance device 19 determines that the number of lanes on the road increases. On the other hand, when there is a bridge ahead of the subject vehicle V and the lane in which the subject vehicle V travels merges with an adjacent lane before the bridge due to the decrease in the road width, the travel assistance device 19 determines that the number of lanes on the road decreases. When there is neither a branching position nor a lane merging position ahead of the current position of the subject vehicle V, the travel assistance device 19 determines that the number of lanes on the road does not change.

Then, when the number of lanes on the road on which the subject vehicle V travels increases ahead of the subject vehicle V, the travel assistance device 19 determines whether or not the increased lane heads to a different point than another lane. For example, when the automobile-only road on which the subject vehicle V travels branches ahead of the current position of the subject vehicle V into a main line that goes straight on the automobile-only road and a branch line that exits the automobile-only road, the point which the branch line as the increased lane heads to is a general road, and it heads to a different point than the main line, which is the automobile-only road. The travel assistance device 19 therefore determines that the branch line, which is the increased lane, heads to a different point than the main line, which is another lane. On the other hand, on an automobile-only road, when another lane merges with the main line, on which the subject vehicle V travels, ahead of the current position of the subject vehicle V, the point which the other lane as the increased lane heads to and the point which the main line as another lane heads to are the same. The travel assistance device 19 therefore determines that the increased lane and the main line head to the same point.

Then, the travel assistance device 19 determines, based on the information on the current position of the subject vehicle V acquired from the subject vehicle position detection device 14 and the travel route acquired from the navigation device 15, whether or not the subject vehicle needs to enter the increased lane in order to head to the set destination. For example, provided that the road on which the subject vehicle V travels branches into a main line and a branch line ahead of the current position of the subject vehicle V, when the travel route is set to travel on the main line, the travel assistance device 19 determines that the subject vehicle V does not need to enter the increased lane. On the other hand, provided that the road on which the subject vehicle V travels branches into a main line and a branch line ahead of the current position of the subject vehicle V, when the travel route is set to enter the branch line, the travel assistance device 19 determines that the subject vehicle V needs to enter the branch line, which is the increased lane.

In the travel scene illustrated in FIG. 9, the subject vehicle V is traveling at the position P1 in the lane L2, so the road on which the subject vehicle V travels branches into the main line L2 and the branch line L3 at the branching position B1 ahead of the position P1, which is the current position of the subject vehicle V. Thus, the number of lanes on the road increases. Moreover, since the branch line L3, which is the increased lane, heads to a different point than the lane L2, the main line L2 and the branch line L3 head to different points. Furthermore, the travel route toward the destination Px is set so as to enter the branch line L3. Therefore, the travel assistance device 19 determines that the subject vehicle V needs to change lanes from the lane L2 to the lane L3.

The above-described method for determining whether or not it is necessary to perform a lane change can be applied to both the first lane change and the second lane change. For example, if the subject vehicle V executes the first LCP along the trajectory T2 and concludes the LCP at the position P3, the subject vehicle V is traveling at the position P3 in the lane L3, so the road on which the subject vehicle V travels branches into the lane L3 and the branch line L4 at the branching position B2 ahead of the position P3, which is the current position of the subject vehicle V. Thus, the number of lanes on the road increases. Moreover, since the branch line L4, which is the increased lane, heads to a different point than the lane L3, the lane L3 and the branch line L4 head to different points. Furthermore, the travel route toward the destination Px is set so as to enter the branch line L4. Therefore, the travel assistance device 19 determines that the subject vehicle V needs to change lanes from the lane L3 to the lane L4.

The determination unit 5 has a function of determining, particularly in the second lane change, whether or not the distance from the position at which the first lane change has concluded to the position at which the second lane change can be started is a predetermined distance or less. Hereinafter, the position at which the first lane change has concluded will also be referred to as a "first position," and the position at which the second lane change can be started will also be referred to as a "second position." Specifically, the first position is a position at which the LCM or LCP for the first lane change has concluded. In the travel scene illustrated in FIG. 9, the position P3 at which the first LCP concludes is the first position. The first position may be any position between the position at which the LCM has concluded and the position at which the LCP has concluded. On the other hand, the second position is a position at which the LCM or LCP for the second lane change can be started. In the travel scene illustrated in FIG. 9, the branching position B2 is the second position. The second position may be a position at which the number of lanes on the road increases, a position at which the width of the road starts to increase when the road branches, or a position at which the lane starts to branch when the road branches.

The distance from the first position to the second position is, for example, a distance D1 illustrated in FIG. 9. Here, the distance D1 is a distance along the traveling direction (direction of arrow A) of the road on which the subject vehicle V travels. The predetermined distance can be set to an appropriate value within a range that allows the driver to appropriately recognize that the vehicle is in a travel scene of performing two or more lane changes in succession. The predetermined distance is, for example, 500 to 1000 m. If the predetermined distance is set longer than this, the travel distance from the completion of the first lane change to the start of the second lane change will become longer, and the driver cannot recognize that the two lane changes are successive, and will feel uncomfortable.

When the determination unit 5 determines that the distance D1 from the first position to the second position exceeds the predetermined distance, the assistance unit 4 uses the lane keeping control with the lane keeping unit 421 to make the subject vehicle V travel straight ahead. On the other hand, when the determination unit 5 determines that the distance from the first position to the second position is the predetermined distance or less, the assistance unit 4 determines whether or not the assistance with the autonomous lane change control is enabled for the second lane change. Specifically, the assistance unit 4 determines whether or not to satisfy the conditions for enabling the assistance with the autonomous lane change control (i.e., conditions for activating the autonomous lane change control) for the second lane change.

The conditions for enabling the assistance with the autonomous lane change control are those for changing lanes without giving strange or uncomfortable feeling to the occupants including the driver, or those for not significantly changing the behavior of the subject vehicle V in the front-back direction and right-left direction during the execution of the autonomous lane change control. The conditions are, for example, the condition (1) for transitioning to the autonomous steering control/hands-on mode and the condition (9) for transitioning to the lane change mode, as illustrated in FIG. 7.

The conditions for enabling the assistance with the autonomous lane change control include, for example, a condition that lane markers on both sides of the subject vehicle V are being detected, a condition that the driver is holding the steering wheel, a condition that the subject vehicle V is traveling near the center of the lane, a condition that the direction indicators are not operating, a condition that the windshield wiper is not operating at a high speed (HI) (i.e., no heavy rain or snow is observed around the subject vehicle V), a condition that the vehicle is traveling on a road on which a high-definition map is available (in particular, the high-definition map information is available for the road on which the subject vehicle V travels from the start to completion of the autonomous lane change), a condition that when a high-precision map is available, there is not a tollgate, an exit, a merging point, an intersection, or a point at which the number of lanes decreases, within about 200 m ahead, a condition that the road on which the subject vehicle V travels from the start to completion of the autonomous lane change is not registered in the high-precision map information as a road on which the autonomous lane change cannot be performed, a condition that the vehicle is traveling at a traveling speed within a predetermined range (e.g., a traveling speed of 1 to 30 km/h or more and 40 to 70 km/h or less), a condition that the GPS signals are enabled, a condition that the radius of curvature of the road on which the subject vehicle V travels from the start to completion of the autonomous lane change is a predetermined value (e.g., 200 to 1000 m) or more, a condition that there are no sharp curves of 100 R or less within approximately 500 m ahead, a condition that the vehicle is not traveling in a tunnel that exceeds 500 m from the tunnel entrance, a condition that a lane change is proposed by the route traveling assist control with the route traveling unit 424 and the driver has operated the lane change assist switch 176, and a condition that the driver has operated the direction indicator lever to execute the autonomous lane change control. Specifically, when the high-definition map information is available for the road on which the subject vehicle V travels from the start to completion of the lane change with the autonomous lane change control, the assistance unit 4 determines that the assistance with the autonomous lane change control is enabled. In the present embodiment, the conditions for enabling the assistance with the autonomous lane change control may not include a condition that there is a space in the adjacent lane for the subject vehicle V to enter the adjacent lane. In this case, whether or not there is a space for the subject vehicle V to enter the adjacent lane is determined separately as to whether or not a lane change is possible.

The assistance unit 4 may determine that the assistance with the autonomous lane change control is enabled, provided that the radius of curvature of the road on which the subject vehicle V travels from the start to completion of the lane change with the autonomous lane change control is a predetermined value or more, the road is not registered in the high-precision map information as a road on which the lane change with the autonomous lane change control cannot be made, the traveling speed of the subject vehicle V is within a predetermined range, and the behavior of the subject vehicle V is within a range in which the behavior can be controlled with the autonomous lane change control during execution of the lane change with the autonomous lane change control. The traveling speed of the subject vehicle V being within a predetermined range means that the traveling speed of the subject vehicle V is within a range in which the autonomous steering control with the steering control unit 42 can be executed, such as the traveling speed of the subject vehicle V being 10 to 30 km/h or more and 60 to 80 km/h or less. The range in which the behavior of the subject vehicle V can be controlled with the autonomous lane change control is to be set at least by one of the acceleration, deceleration, and lateral acceleration of the subject vehicle V, and an appropriate value can be set for each of the acceleration, deceleration, and lateral acceleration within a range that does not give uncomfortable feeling to the occupants including the driver. The reason why the behavior of the subject vehicle V deviates from the range in which the behavior can be controlled with the autonomous lane change control is due to the shape of the road on which the subject vehicle V travels, so the road on which the behavior of the subject vehicle V changes significantly may be preliminarily registered in the high-precision map information as a road on which the autonomous lane change control cannot be made.

The conditions for enabling the assistance with the autonomous lane change control further include a condition that the distance from the first position to the position at which the second lane change is no longer possible is longer than the distance required to execute the LCP or LCM (e.g., 700 to 1500 m). For example, in the travel scene illustrated in FIG. 9, a position B3 is the position at which the lane L3 and the lane L4 diverge, and the distance from the first position to the position at which the second lane change is no longer possible refers to a distance D2 along the traveling direction (direction of arrow A) of the road on which the subject vehicle V travels, as illustrated in FIG. 9. Once the vehicle passes the position B3, it is no longer possible to change lanes from the lane L3 to the lane L4. The subject vehicle V therefore needs to perform a lane change before reaching the position B3.

Performing a lane change before reaching the position B3 means that when the subject vehicle V is viewed from above, the entire vehicle body of the subject vehicle V is included in the lane L4 before the rear end portion of the subject vehicle V reaches the position B3. That is, it is sufficient that the LCM is concluded before the rear end portion of the vehicle body of the subject vehicle V reaches the position B3, and the LCP does not necessarily need to be concluded. Although the distance D1 and the distance D2 can be set to appropriate values, the distance D1 is set to a shorter distance than the distance D2.

When determining that the above-described conditions for enabling the assistance with the autonomous lane change control are satisfied, the assistance unit 4 determines that the assistance with the autonomous lane change control is enabled for the second lane change. Then, by the route traveling assist control with the route traveling unit 424, the autonomous lane change is executed as the second lane change. On the other hand, when determining that the conditions for enabling the assistance with the autonomous lane change control are not satisfied, the assistance unit 4 determines that the assistance with the autonomous lane change control is not enabled for the second lane change. In this case, the second lane change is performed by the driver's manual operation. In this operation, in order to prompt the driver to manually change lanes, the function of the notification unit 6 is used to notify the driver that the autonomous lane change cannot be made. The notification uses the output device 18 such as a display in the instrument panel or a speaker.

In addition, when determining that the assistance with the autonomous lane change control is enabled for the second lane change, the assistance unit 4 determines whether or not the lane change can be made from the subject vehicle lane to the adjacent lane (i.e., whether the subject vehicle V is actually able to enter the adjacent lane). In the travel scene illustrated in FIG. 9, the lane L3 in which the subject vehicle V travels is the subject vehicle lane, and the lane L4 adjacent to the lane L3 is the adjacent lane. When determining whether or not it is possible for the subject vehicle V to change lanes from the lane L3 to the lane L4, the function of the acquisition unit 3 uses the imaging device 11 and the ranging device 12 to detect a space for the subject vehicle V to enter the adjacent lane (i.e., lane L4). The space is a space in which the subject vehicle V can ensure at least the travel distance to conclude the LCM.

When the space for the subject vehicle V to enter the adjacent lane (lane L4) can be detected using the function of the acquisition unit 3, the travel assistance device 19 determines that the lane change can be made from the subject vehicle lane (lane L3) to the adjacent lane (lane L4). Then, the function of the assistance unit 4 (in particular, the route traveling unit 424) is used to perform the autonomous lane change. On the other hand, when such a space cannot be detected, the travel assistance device 19 determines that the lane change cannot be made from the subject vehicle lane (lane L3) to the adjacent lane (lane L4). In this case, the travel assistance device 19 uses the function of the notification unit 6 to notify the driver that the autonomous lane change cannot be made.

Figure 10:
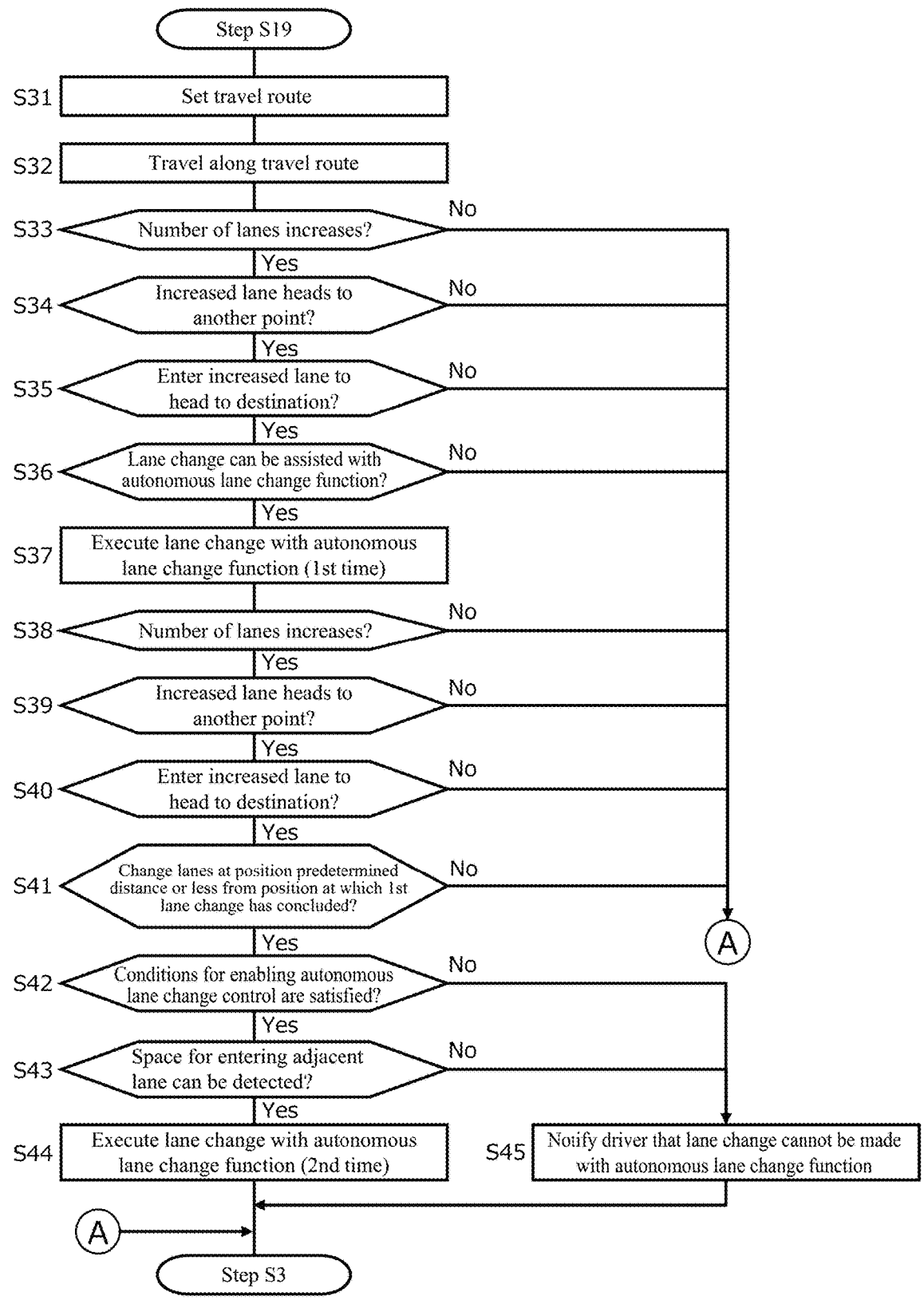
FIG. 10 is a flowchart illustrating an example of the subroutine of step S20 in FIG. 8.

With reference to FIG. 10, processing in the route traveling assist control will be described below. FIG. 10 is a subroutine of step S20 of the flowchart illustrated in FIG. 8. The subroutine illustrated in FIG. 10 is merely an example, and is not limited to this. The processing described below is executed by the CPU (processor) 191 of the travel assistance device 19 at predetermined time intervals.

First, in step S31, the function of the acquisition unit 3 is used to acquire the travel route generated by the navigation device 15 and set it as the travel route. In subsequent step S32, the function of the route traveling unit 424 is used with the vehicle control device 16 to control the subject vehicle V to travel along the travel route. In subsequent step S33, the function of the route traveling unit 424 is used with the map information 13 and the subject vehicle position detection device 14 to determine whether or not the number of lanes on the road ahead of the road on which the subject vehicle V travels increases in the traveling direction. When a determination is made that the number of lanes on the road ahead of the road on which the subject vehicle V travels increases in the traveling direction, the process proceeds to step S34. On the other hand, when a determination is made that the number of lanes on the road ahead of the road on which the subject vehicle V travels does not change or decreases in the traveling direction, the process returns to step S3.

In step S34, the map information 13 is used to determine whether or not the increased lane heads to a different point than another lane. When a determination is made that the increased lane heads to a different point than the other lane, the process proceeds to step S35. On the other hand, when a determination is made that the increased lane heads to the same point as the other lane, the process returns to step S3.

In step S35, a determination is made, based on the information on the current position of the subject vehicle V and the travel route, whether or not the subject vehicle V needs to enter the increased lane in order to head to the set destination. When a determination is made that the subject vehicle V needs to enter the increased lane, the process proceeds to step S36. On the other hand, when a determination is made that the subject vehicle V does not need to enter the increased lane, the process returns to step S3.

In step S36, the function of the assistance unit 4 (in particular, the route traveling unit 424) is used to determine whether or not the lane change can be assisted by the autonomous lane change control. The map information 13 and the detection results of the onboard sensor 163 are used for this determination. When a determination is made that the lane change can be assisted by the autonomous lane change control, the process proceeds to step S37, in which the autonomous lane change is executed. The lane change in step S37 corresponds to the first lane change. Step S37 assumes that a space for the subject vehicle V to enter the adjacent lane can be detected, but when the space cannot be detected, the process returns to step S3 without executing the autonomous lane change. On the other hand, when a determination is made that the lane change cannot be assisted by the autonomous lane change control, the process returns to step S3.

After executing the autonomous lane change in step S37, the process proceeds to step S38, and likewise step S33, a determination is made as to whether or not the number of lanes on the road ahead of the road on which the subject vehicle V travels increases in the traveling direction. Steps S38 to S40 are the same processes as steps S33 to S35, respectively, so the description will be omitted.

In step S41, the function of the determination unit 5 is used to determine whether or not the distance D1 from the first position at which the first lane change is concluded to the second position at which the second lane change can be started is a predetermined distance or less. When a determination is made that the distance D1 is the predetermined distance or less, the process proceeds to step S42. On the other hand, when a determination is made that the distance D1 exceeds the predetermined distance, the process returns to step S3.

In step S42, the function of the assistance unit 4 is used to determine whether or not to satisfy the conditions for enabling (activating) the autonomous lane change control for the second lane change. When a determination is made that the conditions for enabling the autonomous lane change control are satisfied, the process proceeds to step S43. On the other hand, when a determination is made that the conditions for enabling the autonomous lane change control are not satisfied, the process proceeds to step S45, in which the function of the notification unit 6 is used to notify the driver that the lane change with the autonomous lane change control cannot be made.

In step S43, the function of the acquisition unit 3 is used with the imaging device 11 and the ranging device 12 to detect a space for the subject vehicle V to enter the adjacent lane. When a space for the subject vehicle V to enter the adjacent lane can be detected (i.e., the space exists and the subject vehicle V can enter the adjacent lane), the process proceeds to step S44, in which the autonomous lane change is executed. The lane change in step S44 corresponds to the second lane change. On the other hand, when a space for the subject vehicle V to enter the adjacent lane cannot be detected (i.e., the space does not exist and the subject vehicle V cannot enter the adjacent lane), the process proceeds to step S45. Then, when the processing in steps S44 and S45 is concluded, the process returns to step S3.

Embodiments of the Present Invention

As described above, according to the present embodiment, a travel assistance method for a vehicle executed by a processor is provided. This method uses autonomous lane change control that performs a lane change with autonomous travel control. The processor operates to: when performing a first lane change using the autonomous lane change control and then performing a second lane change for traveling along a set travel route, determine whether or not a distance D1 from a position at which the first lane change has concluded to a position at which the second lane change can be started is a predetermined distance or less; when determining that the distance is the predetermined distance or less, determine whether or not assistance with the autonomous lane change control is enabled for the second lane change; when determining that the assistance with the autonomous lane change control is enabled, determine whether or not a lane change can be made from a subject vehicle lane in which the vehicle travels to an adjacent lane that is adjacent to the subject vehicle lane; when determining that the lane change from the subject vehicle lane to the adjacent lane can be made, perform the second lane change with the autonomous lane change control; when determining that the lane change from the subject vehicle lane to the adjacent lane cannot be made, notify a driver that the lane change with the autonomous lane change control cannot be made; and when determining that the assistance with the autonomous lane change control is not enabled, notify the driver that the lane change with the autonomous lane change control cannot be made. This makes it possible to notify the driver of appropriate information in accordance with whether or not a lane change using the autonomous travel control can be executed. Moreover, it is possible to suppress the uncomfortable feeling given to the driver caused by the discrepancy between the autonomous travel control expected by the driver (in particular, the autonomous lane change) and the actual autonomous travel control.

Additionally or alternatively, in the travel assistance method for a vehicle of the present embodiment, the processor operates to: when determining whether or not the lane change from the subject vehicle lane to the adjacent lane can be made, detect a space for the vehicle to enter the adjacent lane; when the space can be detected, determine that the lane change from the subject vehicle lane to the adjacent lane can be made; and when the space cannot be detected, determine that the lane change from the subject vehicle lane to the adjacent lane cannot be made. This makes it possible to more accurately determine whether or not the lane change can be made.

Additionally or alternatively, in the travel assistance method for a vehicle of the present embodiment, when high-precision map information is available for a road on which the vehicle travels from start to completion of the lane change with the autonomous lane change control, a determination is made that the assistance with the autonomous lane change control is enabled. This makes it possible to more accurately determine whether or not the autonomous lane change can be executed.

Additionally or alternatively, in the travel assistance method for a vehicle of the present embodiment, a determination is made that the assistance with the autonomous lane change control is enabled, provided that: a radius of curvature of a road on which the vehicle travels from start to completion of the lane change with the autonomous lane change control is a predetermined value or more; the road is not registered in high-precision map information as a road on which the lane change with the autonomous lane change control cannot be made; a traveling speed of the vehicle is within a predetermined range; and a behavior of the vehicle is within a range in which the behavior can be controlled with the autonomous lane change control during execution of the lane change with the autonomous lane change control. This makes it possible to more accurately determine whether or not the autonomous lane change can be executed.

Additionally or alternatively, in the travel assistance method for a vehicle of the present embodiment, the range is set at least by one of acceleration, deceleration, and lateral acceleration of the vehicle. This makes it possible to more accurately determine whether or not the autonomous lane change can be executed.

Additionally or alternatively, according to the present embodiment, a travel assistance device for a vehicle is provided, comprising: a determination unit 5 configured to, when performing a first lane change with autonomous lane change control that makes a lane change with autonomous travel control and then performing a second lane change for traveling along a set travel route, determine whether or not a distance D1 from a position at which the first lane change has concluded to a position at which the second lane change can be started is a predetermined distance or less; an assistance unit 4 configured to: when the determination unit 5 determines that the distance D1 is the predetermined distance or less, determine whether or not assistance with the autonomous lane change control is enabled for the second lane change; when determining that the assistance with the autonomous lane change control is enabled, determine whether or not a lane change can be made from a subject vehicle lane in which the vehicle travels to an adjacent lane that is adjacent to the subject vehicle lane; and when determining that the lane change from the subject vehicle lane to the adjacent lane can be made, perform the second lane change with the autonomous lane change control; and a notification unit 6 configured to, when the assistance unit 4 determines that the lane change from the subject vehicle lane to the adjacent lane cannot be made, notify a driver that the lane change with the autonomous lane change control cannot be made, the notification unit 6 being further configured to, when the assistance unit 4 determines that the assistance with the autonomous lane change control is not enabled for the second lane change, notify the driver that the lane change with the autonomous lane change control cannot be made. This makes it possible to notify the driver of appropriate information in accordance with whether or not a lane change using the autonomous travel control can be executed. Moreover, it is possible to suppress the uncomfortable feeling given to the driver caused by the discrepancy between the autonomous travel control expected by the driver (in particular, the autonomous lane change) and the actual autonomous travel control.

DESCRIPTION OF REFERENCE NUMERALS

1 Travel assistance system
11 Imaging device
12 Ranging device
13 Map information
14 Subject vehicle position detection device
15 Navigation device
16 Vehicle control device
161 Vehicle speed control device
162 Steering control device
163 Onboard sensor
17 Input device
171 Main switch
172 Resume/acceleration switch
173 Set/coast switch
174 Cancel switch
175 Inter-vehicle distance adjustment switch
176 Lane change assist switch
18 Output device
19 Travel assistance device
191 CPU (processor)
192 ROM
193 RAM
2 Control unit
3 Acquisition unit
4 Assistance unit
41 Speed control unit
42 Steering control unit
421 Lane keeping unit
422 Lane changing unit
423 Overtaking unit
424 Route traveling unit
5 Determination unit
6 Notification unit
A Arrow (traveling direction)
B1, B2 Branching position
B3 Position
D1, D2 Distance
L1, L2, L3, LA Lane
P1, P2, P3, P4 Position
Px Destination
T1, T2, T3 Trajectory
V Subject vehicle

The invention claimed is:

1. A travel assistance method for a vehicle using a processor that executes autonomous lane change control based on a travel route to a destination acquired from a navigation device, the processor operating to:
when performing a first lane change with the autonomous lane change control and then performing a second lane change for traveling along the travel route, determine whether or not a distance from a position at which the first lane change has concluded to a position at which the second lane change can be started is a predetermined distance or less;
determine whether or not assistance with the autonomous lane change control is enabled for the second lane change;
when determining that the assistance with the autonomous lane change control is not enabled for the second lane change, unless the distance is the predetermined distance or less, not perform the second lane change with the autonomous lane change control and not notify a driver that a lane change with the autonomous lane change control cannot be made; and
even when determining that the assistance with the autonomous lane change control is not enabled for the second lane change, when determining that the distance is the predetermined distance or less, not perform the second lane change with the autonomous lane change control and notify the driver that the lane change with the autonomous lane change control cannot be made.

2. The travel assistance method for a vehicle according to claim 1, wherein the processor operates to:
when determining whether or not the lane change from a subject vehicle lane in which the vehicle travels to an adjacent lane that is adjacent to the subject vehicle lane can be made, detect a space for the vehicle to enter the adjacent lane;
when the space can be detected, determine that the lane change from the subject vehicle lane to the adjacent lane can be made; and
when the space cannot be detected, determine that the lane change from the subject vehicle lane to the adjacent lane cannot be made.

3. The travel assistance method for a vehicle according to claim 1, comprising,
when high-precision map information is available for a road on which the vehicle travels from start to completion of the lane change with the autonomous lane change control,
determining that the assistance with the autonomous lane change control is enabled.

4. The travel assistance method for a vehicle according to claim 1, comprising,
determining that the assistance with the autonomous lane change control is enabled, provided that:
a radius of curvature of a road on which the vehicle travels from start to completion of the lane change with the autonomous lane change control is a predetermined value or more;
the road is not registered in high-precision map information as a road on which the lane change with the autonomous lane change control cannot be made;
a traveling speed of the vehicle is within a predetermined range; and
a behavior of the vehicle is within a range in which the behavior can be controlled with the autonomous lane change control during execution of the lane change with the autonomous lane change control.

5. The travel assistance method for a vehicle according to claim 4, wherein the range is set at least by one of acceleration, deceleration, and lateral acceleration of the vehicle.

6. A travel assistance device for a vehicle that executes autonomous lane change control based on a travel route to a destination acquired from a navigation device, the travel assistance device comprising a processor configured to:
when performing a first lane change with autonomous lane change control and then performing a second lane change for traveling along the travel route, determine whether or not a distance from a position at which the first lane change has concluded to a position at which the second lane change can be started is a predetermined distance or less;

determine whether or not assistance with the autonomous lane change control is enabled for the second lane change; and notify a driver that a lane change with the autonomous lane change control cannot be made, wherein when the assistance with the autonomous lane change control is determined not to be enabled for the second lane change, unless the distance is determined to be the predetermined distance or less, the processor is configured to not perform the second lane change with the autonomous lane change control and to not notify the driver that a lane change with the autonomous lane change control cannot be made, wherein even when the assistance with the autonomous lane change control is determined not to be enabled for the second lane change, when the distance is determined to be the predetermined distance or less, the processor is configured to not perform the second lane change with the autonomous lane change control and to notify the driver that the lane change with the autonomous lane change control cannot be made.

* * * * *